US011315162B2

(12) United States Patent
Westlake et al.

(10) Patent No.: US 11,315,162 B2
(45) Date of Patent: Apr. 26, 2022

(54) INTERNET OF THINGS (IOT) CONFIGURATOR

(71) Applicant: NuFronteer Media Inc., New York, NY (US)

(72) Inventors: Mark W. Westlake, Malverne, NY (US); Lance A. Lewis, Pennington, NJ (US)

(73) Assignee: NUFRONTEER MEDIA INC., New York, NY (US)

( * ) Notice: Subject to any disclaimer, the term of this patent is extended or adjusted under 35 U.S.C. 154(b) by 35 days.

(21) Appl. No.: 16/840,253

(22) Filed: Apr. 3, 2020

(65) Prior Publication Data

US 2020/0334730 A1 Oct. 22, 2020

Related U.S. Application Data

(60) Provisional application No. 62/829,362, filed on Apr. 4, 2019.

(51) Int. Cl.
*G06Q 30/00* (2012.01)
*G06Q 30/06* (2012.01)
(Continued)

(52) U.S. Cl.
CPC ..... *G06Q 30/0627* (2013.01); *G06F 16/9535* (2019.01); *G06K 9/6215* (2013.01); *G06N 20/00* (2019.01); *G06Q 30/0251* (2013.01)

(58) Field of Classification Search
None
See application file for complete search history.

(56) References Cited

U.S. PATENT DOCUMENTS 6,405,175 B1 * 6/2002 Ng ................ G06Q 30/02
705/14.26
11,048,606 B2 * 6/2021 Kambaloor ......... G06F 11/3428
(Continued)

OTHER PUBLICATIONS

Alessio Tonioni et al. "A deep learning pipeline for product recognition on store shelves" 2018 IEEE International Conference on Image Processing, Applications and Systems (IPAS), pp. 25-31. (Year: 2018).*

*Primary Examiner* — Naeem U Haq
(74) *Attorney, Agent, or Firm* — Hamilton, Brook, Smith & Reynolds, P.C.

(57) ABSTRACT

An apparatus and corresponding method include a web-based database solution that may be referred to as the "IoT Configurator." In one example, the IoT Configurator is a machine learning software tool that assists consumers by identifying compatible IoT products for devices they already own or plan to buy in the near future. The IoT Configurator may be configured to provide reviews, news, advice and recommendations regarding IoT devices and services. The IoT Configurator enables a user to learn which IoT products and services are right for them, and how such IoT products/services may be connected. The IoT Configurator enables a user to identify IoT devices that are compatible, that is, IoT devices that may interoperate with each other and share data. The IoT Configurator may employ data stored in at least one IoT database and use that data to help a consumer understand an IoT product's connectivity and compatibility, thereby simplifying the complexity of the IoT product for the user.

21 Claims, 12 Drawing Sheets

(51) Int. Cl.
*G06Q 30/02* (2012.01)
*G06F 16/9535* (2019.01)
*G06N 20/00* (2019.01)
*G06K 9/62* (2022.01)

(56) References Cited

U.S. PATENT DOCUMENTS

| | | | |
|---|---|---|---|
| 2012/0220282 A1* | 8/2012 | Kwon | H04W 4/023 |
| | | | 455/418 |
| 2016/0027084 A1* | 1/2016 | Otero | G06Q 30/014 |
| | | | 705/26.25 |
| 2019/0370401 A1* | 12/2019 | Grant | G06F 16/24578 |
| 2020/0065424 A1* | 2/2020 | Ananthapur Bache | G06N 3/08 |
| 2020/0195545 A1* | 6/2020 | Chuang | H04L 43/50 |
| 2020/0273090 A1* | 8/2020 | Ayush | G06T 7/60 |

* cited by examiner

FIG. 3A

INTERNET OF THINGS (IOT) CONFIGURATOR

RELATED APPLICATION

This application claims the benefit of U.S. Provisional Application No. 62/829,362, filed on Apr. 4, 2019. The entire teachings of the above application is incorporated herein by reference.

BACKGROUND

The Internet is a global system of interconnected computers and computer networks that use a standard Internet protocol suite (e.g., the Transmission Control Protocol (TCP) and Internet Protocol (IP)) to communicate with each other. The Internet of Things (IoT) is based on the idea that everyday objects, not just computers and computer networks, can be readable, recognizable, locatable, addressable, and controllable via an IoT communications network (e.g., an ad-hoc system or the Internet).

Low cost processors and wireless networks have enabled an opportunity to turn any "thing," from a dog collar to a j et engine, into part of the IoT. Embedded with technology, IoT devices (also referred to interchangeably herein as "connected" devices) can communicate and interact over the IoT communications network without requiring human-to-human or human-to-computer interaction. As development in IoT technologies increases, a number of IoT devices that may surround a user at home, in a vehicle, at work, and at many other locations, may also increase.

SUMMARY

According to an example embodiment, a computer-implemented method for an Internet of Things (IoT) configurator comprises, in response to a user query, searching at least one IoT database for at least one connected product (also referred to interchangeably herein as an IoT device, IoT system or service, "legacy" Internet-accessible device, or "legacy" Internet-accessible system or service), of a plurality of connected products, that is with a given one or more connected products. The at least one IoT database may store product information associated with the plurality of connected products. The user query may represent product information associated with the given one or more connected products and may define at least one search criterion for the searching. The computer-implemented method may comprise generating a response to the user query, wherein, in an event the searching results in the at least one connected product being found, the response may include product information of the at least one connected product.

The searching and generating may be implemented by a web application, mobile application, or one or more web services.

The at least one search criterion may include a respective manufacturer name, product name, model number, series, brand, category, or universal product code (UPC) of the given one or more connected products, or combination thereof. It should be understood that the at least one search criterion may include any suitable information associated with the given one or more connected products and is not limited to the manufacturer name, product name, model number, series, brand, category, or universal product code (UPC) of the given one or more connected products, or combination thereof.

The user query may include an image, text, speech, link, or a combination thereof.

The response may include an image, video, text, speech, link, or a combination thereof.

The computer-implemented method may further comprise displaying a web-based user interface to enable a user to input text of at least a portion of text of the user query.

The computer-implemented method may further comprise matching the at least a portion of text to at least a portion of the product information stored in the at least one IoT database. The matching may be performed in real-time, concurrent with input of the at least a portion of text by the user.

The computer-implemented method may further comprise generating a list, dynamically, based on the matching; enabling the user to select an item from the list generated; and employing the item selected as a search criterion of the at least one search criterion for the searching. The search criterion may be a respective manufacturer name, product name, model number, series, brand, category, or universal product code (UPC) of the given one or more connected products.

The computer-implemented method may perform the matching by way of connected product clustering. A plurality of connected product graphs may be generated from the corpus of product information of connected products data stored in the IoT database. The connected products graphs may be based on linguistic analysis of a corpus of potential connected products. The linguistic analysis may be performed by a connected products linguistic analysis module. The plurality of connected product graphs may be processed into a plurality of connected product clusters through use of one or more proximity metrics, such that each connected product cluster corresponds to a potential connected product that pertains to the same or similar connected produce topics. The connected product clusters may be processed such that topics handled by the IoT configurator accessible on at least one computing device are dynamically generated into a list of matches.

In an event the searching fails to find (i) the given one or more connected products in the at least one IoT database or (ii) any connected product, of the plurality of connected products of the at least one IoT database, that is compatible (i.e., interoperable) with the given one or more connected products, the response may include a suggestion, the suggestion generated via artificial intelligence in lieu of providing a "null result".

The computer-implemented method may further comprise displaying the response in a web page.

The computer-implemented method may further comprise enabling a user to input the user query via a first web page. In the event the searching results in the at least one connected product being found, generating the response may include navigating the user to a second web page. The second web page may display the product information of the at least one connected product, product information of one or more products needed to enable interoperability between the given one or more connected products and the at least one connected product, or a combination thereof.

In the event the searching results in the at least one connected product being found, the response may include one or more links. The computer-implemented method may further comprise enabling the user to select at least one link of the one or more links to purchase the at least one connected product identified as being compatible or to learn more about the at least one connected product identified.

The computer-implemented method may further comprise extracting data from at least one website and updating the at least one IoT database based on the data extracted. The updating may include deleting data from the at least one IoT database, modifying data of the at least one IoT database, adding data to the at least one IoT database, or combination thereof.

The computer-implemented method may further comprise receiving data from at least one data feed and updating the at least one IoT database based on the data received. The updating may include deleting data from the at least one IoT database, modifying data of the at least one IoT database, adding data to the at least one IoT database, or combination thereof.

The computer-implemented method may further comprise collecting structured data, unstructured data, or a combination thereof, via a network; filtering the structured data, unstructured data, or combination thereof, to produce filtered structured data; and storing the filtered structured data in the at least one IoT database.

The collecting may be based on artificial intelligence.

The structured data may reside in a fixed field within a record or file and the unstructured data may include text, multimedia content, or a combination thereof.

The filter structured data may be stored in an IoT database. Interoperability factors may be assigned to each connected product identified in the structured data. A scoring engine may be used to determine an interoperability score for the connected products by (a) defining a threshold value for each interoperability factor; (b) determining a degree to which each interoperability factor is present for each of the connected products; (c) for each of the interoperability factors, allotting a score for the respective interoperability factor of a subject connected product based on the degree to which a respective interoperability factor is present; and (c) aggregating scores for each interoperability factor for each connected product to determine an interoperability score for that connected product.

Each connected product may be associated with a respective vector representative of each of its interoperability factor scores and its aggregated interoperability score. The vector space containing each of the interoperability scores for each of the connected products may be mapped to facilitate quick processing of any matches to a search query from a user. By storing the interoperability factor scores and the aggregated interoperability scores in vector space, the vectors can be search efficiently to reduce latency in presenting any matching results in a list to the user.

The at least one IoT database may be a relational database management system (RDBMS), object-oriented database management system (OODBMS), or NoSQL database. It should be understood that the at least one IoT database is not limited to types of databases disclosed herein.

The at least one connected product may include at least one IoT device, system of IoT devices, at least one service, at least one application, at least one command, or a combination thereof.

According to another example embodiment, an apparatus may be configured to implement an Internet of Things (IoT) configurator. The apparatus may comprise a user interface, processor, and memory. The memory may be coupled to the processor and may have stored thereon a sequence of instructions which, when loaded and executed by the processor, causes the processor to, in response to a user query received via the user interface, perform a search at least one IoT database for at least one connected product, of a plurality of connected products, that is compatible with a given one or more connected products. The at least one IoT database may store product information associated with the plurality of connected products. The user query may represent product information associated with the given one or more connected products and may define at least one search criterion for the searching. The sequence of instructions may cause the processor to generate a response to the user query, the response displayed to a user via the user interface. In an event the search finds the at least one connected product, the response may include product information of the at least one connected product identified.

Alternative apparatus embodiments parallel those described above in connection with the example method embodiment.

According to yet another example embodiment, a computer-implemented method for operating an Internet of Things (IoT) configurator question and answering system may comprise searching at least one IoT database in response to a user query. The user query may be related to a given one or more connected products. The searching may employ at least one search criterion identified from the user query and associated with product information of the given one or more connected products. The at least one IoT database may store product information corresponding to a plurality of connected products.

The computer-implemented method may comprise generating a response to the user query. The response may be based on at least a portion of the product information. The at least a portion may be retrieved via the at least one search criterion.

The user query may include an image, text, speech, link, or a combination thereof.

The response may include an image, video, text, speech, link, or a combination thereof.

The response may include compatibility or connectivity information related to interoperability between the given one or more connected products and one or more connected product of the plurality of connected products.

The response may include configuration, warranty, or other information associated with the given one or more connected products.

The response may include a proposed configuration solution to an interoperability problem associated with the given one or more connected products and at least one other connected product. The interoperability problem may be identified in the user query.

The user query may include an image. The searching may include employing an image recognition method to process the image and identify the at least one search criterion for the searching.

The user query may include speech. The searching may include employing a voice recognition method to process the speech to identify the at least one search criterion for the searching.

The computer-implemented method may further comprise employing artificial intelligence to determine the response.

It should be understood that example embodiments disclosed herein can be implemented in the form of a method, apparatus, system, or computer readable medium with program codes embodied thereon.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIG. 3A is a block diagram of an example embodiment of a results web page of the IoT Configurator.

DETAILED DESCRIPTION

Figure 1:
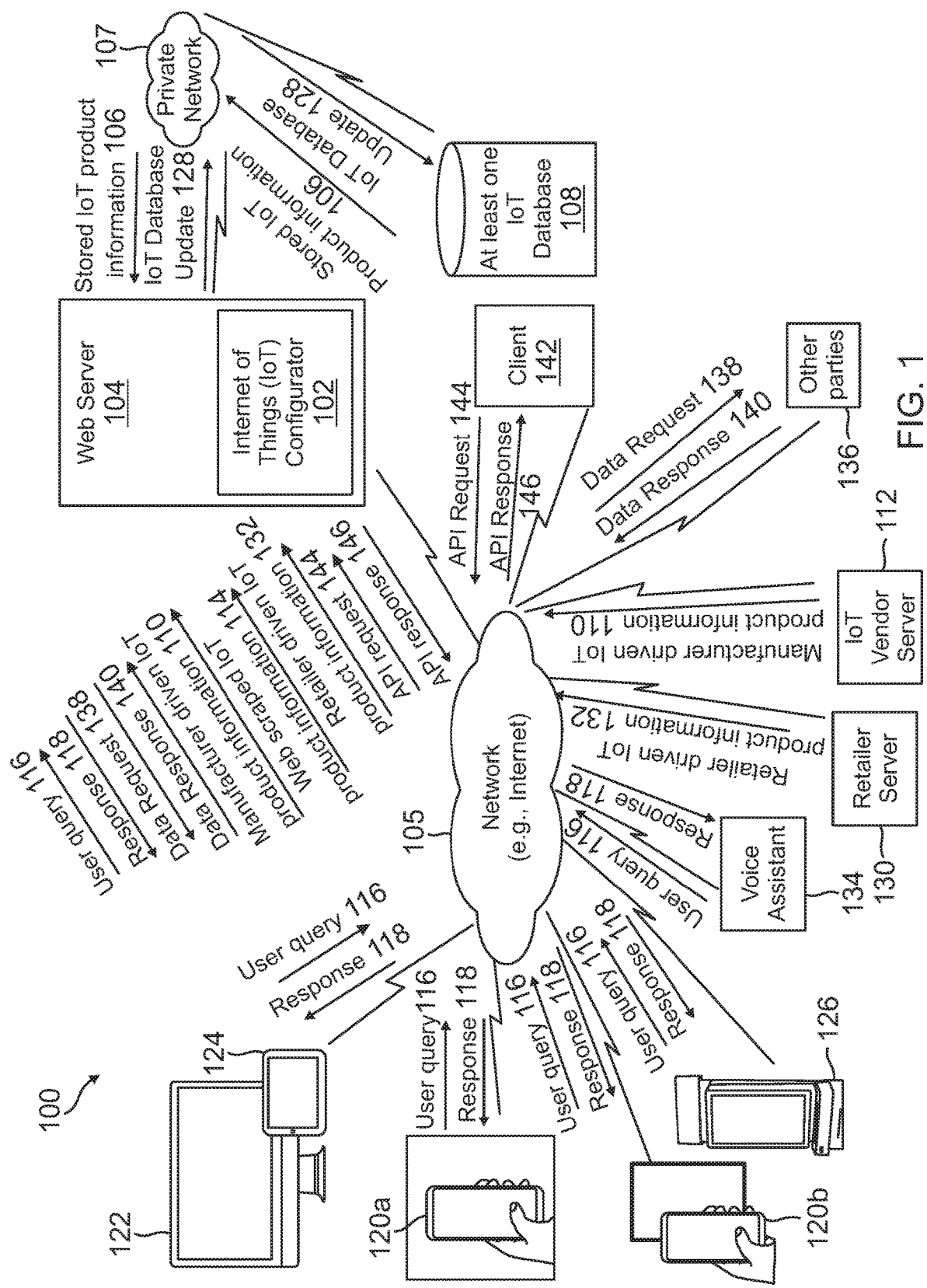
FIG. 1 is a block diagram of an example embodiment of a system architecture that includes an Internet of Things (IoT) Configurator.

A description of example embodiments follows. Further technical details are disclosed in the attached Appendix.

It should be understood that the singular forms "a," "an," and "the" are intended to include the plural forms as well, unless the context clearly states otherwise. As used herein, the term "Internet of Things device" (or "IoT device") may be referred to interchangeably as a "connected device" or "connected product," and may refer to any object (e.g., an appliance, a sensor, etc.) that has an addressable interface (e.g., an Internet Protocol (IP) address, a Bluetooth identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like.

An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, application-specific integrated circuit (ASIC), field-programmable gate array (FPGA), or the like, and configured for connection to an IoT network(s), such as a local ad-hoc network or the Internet. The IoT device may be configured for connection to IoT network(s) of one or more types.

For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, watches, glasses, cars, medical devices, warehouse devices, assembly line devices, etc., so long as the devices are equipped with an addressable communications interface for communicating with the IoT network. IoT devices may also include cell phones, desktop computers, laptop computers, tablet computers, personal digital assistants (PDAs), printers, storage devices, etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.). It should be understood that such "legacy" Internet-accessible devices may be referred to as "connected" devices.

The IoT has emerged as the biggest wave in the development of the Internet. Experts are predicting there will be over 50 billion "things" or devices connected worldwide by 2020. IoT devices may need manual configuration and some IoT devices may not be compatible, that is, some IoT devices may not interoperate with one another. In the IoT, devices, such as vehicles, home appliances, wearable devices, or any other physical object, are expected to connect, interact, and exchange data. At the center of creating a vast, reliable IoT network lies one significant issue: compatible standards. Connected objects need to be able to speak to each other to transfer data and share data they may be recording.

If IoT devices conform to different standards, they may not interoperate, that is, they may not be able to communicate and share data. As more and more devices become network-aware, a number of IoT devices in a home or business may increase, and a burden and complexity of a purchasing decision regarding a particular IoT device, and configuration thereof, may become overly burdensome if not impossible for a user who is not educated, sufficiently, with respect to IoT device configuration, connectivity, and compatibility.

To simplify the complexity of the IoT, an example embodiment may include a web-based database solution that may be referred to as an "IoT Configurator." The IoT Configurator may be a software tool that assists consumers by identifying compatible IoT products for devices they already own or plan to buy in the near future. According to an example embodiment, a web application, mobile application, or web service(s) may be configured to provide reviews, news, advice and recommendations regarding IoT devices and services. Such a web or mobile application or web service(s), that is, the IoT Configurator, may enable a consumer to learn which IoT products and services are right for them, and how such IoT products/services may be connected. The IoT Configurator may enable a user to identify IoT devices that are compatible, that is, IoT devices that may connect to each other and share data. According to an example embodiment, the IoT Configurator may pull in data from at least one IoT database and use that data to help a user, such as a consumer or salesperson, understand an IoT product's connectivity and compatibility.

For example, a consumer who currently owns a smart thermostat may use the IoT Configurator to identify other IoT products that work with the smart Thermostat or that enable the smart Thermostat to interoperate with other IoT products. According to an example embodiment, the IoT configurator may not only list the compatible product's name but also the compatible product's image, description, specification, review(s) of the compatible product, an affiliate link for immediate purchase of the compatible product, or a combination thereof, thereby providing an IoT Configurator that may be all-inclusive IoT solution for consumers.

According to an example embodiment, the IoT Configurator may be used to help users access IoT product information in a variety of ways (e.g., voice, text, mobile application, desktop application, in-store kiosk, etc.) to "find" what they are looking for in a connected device or system. According to an example embodiment, the IoT Configurator may be a web or mobile application that is communicatively coupled to at least one IoT database and multiple data feeds for feeding IoT product information to the at least one IoT database. The web application may be executed on a remote server, such as a web server, and may be accessed over a network via an Internet browser. The web application may adapt, automatically, based on a particular device(s) that is used for interacting with the web application, such as a desktop PC, tablet, mobile device, or any other suitable device that interacts with a web application. Alternatively, the IoT Configurator may be a mobile application that is built for a specific platform(s). The mobile application may be downloaded and installed on the particular device(s), such as a smartphone, smart watch, smart glasses, vehicle, health monitor, or any other suitable device, via an app store. As such, the mobile application may reside and execute on the particular device(s) itself, the particular device(s) communicating with the web server.

FIG. 1 is a block diagram of an example embodiment of a system architecture 100 that includes an Internet of Things (IoT) Configurator 102. According to the example embodiment, the IoT Configurator 102 is implemented as a web application on a web server 104 that is coupled to a network 105. Alternatively, the IoT Configurator 102 may be implemented as a mobile application or web service(s), as disclosed above. The network 105 may be a suitable public network, such as the Internet. In the system architecture 100, the IoT Configurator 102 may access, via a private network 107, stored IoT product information 106 that is stored in at least one IoT database 108. Alternatively, access to the at least one IoT database 108 may be through the network 105 (also referred to interchangeably herein as a public network). Such access is not shown for simplicity.

The stored IoT product information 106 of the at least one IoT database 108 may be updated in any suitable way. For example, an administrative user may add new data, modify existing data, or delete data from the stored IoT product information 106, or a combination thereof, by accessing the at least one IoT database 108 via a web page (not shown) of the IoT Configurator 102. Alternatively, the stored IoT product information 106 may be updated in the at least one IoT database 108 by the IoT Configurator 102, automatically, via an IoT database update 128 that may be based on manufacturer driven IoT product information 110 from an IoT vendor server 112, retailer driven IoT product information 132 from a retailer server 130, web scraped IoT product information 114, or a combination thereof.

The manufacturer driven IoT product information 110 may be used to provide an IoT database update 128 in any suitable way. For example, a vendor (not shown), that is, a third party, may be granted access to the at least one IoT database 108 to keep the stored IoT product information 106 current. Such stored IoT product information 106 may include any suitable information related to an IoT device.

The stored IoT product information 106 may include setup information, warranty information, capability or compatibility information, of an IoT device, or a combination thereof. The stored IoT product information 106 may include interoperability information of one or more IoT devices or one or more IoT device combinations. For example, the stored IoT product information 114 may include information on configuration(s), additional device(s), such as a physical hub or gateway and configuration thereof, that may enable such one or more IoT device combinations to interoperate. The stored IoT product information 106 may include any suitable information related to a plurality of IoT products or combinations thereof, such as any of the tables of the attached Appendix. It should be understood that the stored IoT product information 106 is not limited to information of the tables of the attached Appendix.

The IoT product information 106 in the database may include interoperability information of one or more IoT devices or one or more IoT device combinations. The IoT product information 106 may be extracted using a web crawler, or an Internet bot that systematically browses IoT products for indexing. In one embodiment, the IoT bot implements a highly optimized architecture that addresses challenges in system design, I/O and network efficiency, and robustness and manageability. The IoT bot may be a component of the IoT configurator.

In one example, the IoT bot automatically extracts product data 106 from IoT sites without knowing their layout beforehand. This is implemented by training the IoT bot to recognize both certain key fields and text values on random web pages and advertisements to identify where information like product name, price, and similar information are located on each product listing. Further, keywords identified may be processed using a value calculation For example, the IoT bot can weigh the importance of an identified keyword to a subject webpage or advertisement of an IoT connected product using a term frequency-inverse document frequency (idf) weighting calculation to determine the value of the identified keyword as an indication of an interoperability factor associated with an IoT connected product. The degree to which the keywords confirm that the interoperability factor is present can be used to quantify a score for that connected product.

For example, each connected product may be associated with a respective vector representative of each of its interoperability factor scores and its aggregated interoperability score. The vector space containing each of the interoperability scores for each of the connected products may be mapped to facilitate quick processing of any matches to a search query from a user. In this way, connected product features can be mapped and compared efficiently and quickly. By storing the interoperability factor scores and the aggregated interoperability scores in vector space, the vectors can be search efficiently to reduce latency in presenting any matching results in a list to the user.

According to an example embodiment, the IoT Configurator 102 may be configured to transmit a data request 138 for data that may enable the IoT Configurator 102 to update the at least one IoT database 108 or perform another function. For example, the data request 138 may be employed for translation of a UPC code image or to retrieve an advertisement to be included. The IoT Configurator 102 may be configured to transmit the data request 138 via the network 105 to a given party of one or more other parties 136 in the system 100. The given party may provide the requested data by returning a data response 140 to the IoT Configurator 102 via the network 105. The other parties 136 may include parties that are associated with one or more of AD management, affiliate links, artificial intelligence (AI), machine learning (ML), natural language processing (NLP), and/or reference databases, such as a universal product code (UPC) database or any other suitable reference database. It should be understood that the data request 138 may be any ancillary data request for data needed for the IoT Configurator 102 to perform its function.

According to an example embodiment, the IoT Configurator 102 may be configured to search the at least one IoT database 108, in response to a user query 116, to identify at least one connected product (not shown), of a plurality of connected products (not shown), as being compatible with a given one or more connected products (not shown). The user query 116 may represent product information associated with the given one or more connected products and may define at least one search criterion for the search. The IoT Configurator 102 may be configured to generate a response 118 to the user query 116. In an event the search identifies the at least one connected product as being compatible, the response 118 may include product information of the at least one connected product that was identified. The response 118 may include any suitable response information, such as capability, interoperability, warranty information, or any other suitable information or link(s) to educate the user or enable a user (not shown) to purchase a connected product.

The user may enter the user query 116 via any suitable electronic device, such as the cell phone 120a or 120b, graphical user interface 122 of a desktop computer (not shown), laptop computer (not shown), tablet computer 124, personal digital assistant (PDA) (not shown), in-store kiosk 126, voice assistant 134, or any other electronic device that may enable the user to access the IoT Configurator 102 that may be implemented as a web or mobile application. The IoT Configurator 102 may enable the user to find the IoT device or IoT device information via a find engine (not shown) that is configured to perform the search. The IoT Configurator 102 may empower a sales associate with the information, details, specifications, and selling points for a plurality of smart home and IoT devices, in their hands, such as via the cell phone 120a.

According to an example embodiment, the IoT Configurator 102 may enable a customer to find the IoT information they need via the in-store kiosk 126, empowering customers with direct access to connectivity, compatibility, or other information on the "things" they own, have bought, or want to buy. According to an example embodiment, the IoT Configurator 102 may employ a user profile to track IoT information associated with the user. Such a user profile may be included within a framework (e.g., object model) of the IoT Configurator 102, such as disclosed in FIG. 4 and the attached Appendix. According to an example embodiment, the IoT Configurator 102 may be a web application that not only enables a user access to IoT documentation, frequently asked questions (FAQs), videos, etc., but also provides the user with connectivity and compatibility information of IoT devices or combinations of IoT devices.

According to an example embodiment, the stored IoT product information 106 may have been "vetted" for accuracy prior to being stored in the at least one IoT database 108. According to an example embodiment, the IoT Configurator 102 may be a mobile application that is communicatively coupled to web service(s) of the web server 104 via the network 105. The IoT Configurator 102 may receive the user query 116 that may be include an image of an IoT device, as well as a question related to the IoT device in the image, and the IoT Configurator 102 may be configured to process the image and question and provide the response 118 that may be based on data that is linked to the IoT device in the stored IoT product information 106 of the at least one IoT database 108.

According to an example embodiment, the IoT Configurator 102 may be implemented as a question answering system and the user query 116 and response 118 may include speech as part of a "conversion" between the user and the IoT Configurator 102. As disclosed above, the IoT Configurator 102 may be implemented as a web or mobile application or web service(s).

According to an example embodiment, users accessing the web or mobile application or web service(s), that is, the IoT Configurator 102, may be assigned a permission level, such as a weight, that may determine access to the at least one IoT database 108 and visibility and access of objects stored therein. An example embodiment of a permissions matrix with user permission types, weights assigned thereto, and respective descriptions of permissions related to same may be found in the attached Appendix.

According to an example embodiment, the IoT Configurator 102 may include an application program interface (API) that enables a client 142 to access the IoT Configurator 102. For example, in response to receiving an API request 144 from the client 142 via the network 105, the IoT Configurator 102 may be configured to transmit an API response 146 to the client 142 via the network 105. The API request 144 and API response 146 may function in a similar manner as the user query 116 and user response 188 but may be developed for different integration platforms and may enable back-end entry into a particular web-site. According to an example embodiment, the client 142 may be a client web site or any other suitable client that is configured to issue API function call(s) supported by the IoT Configurator 102.

Figure 2A:
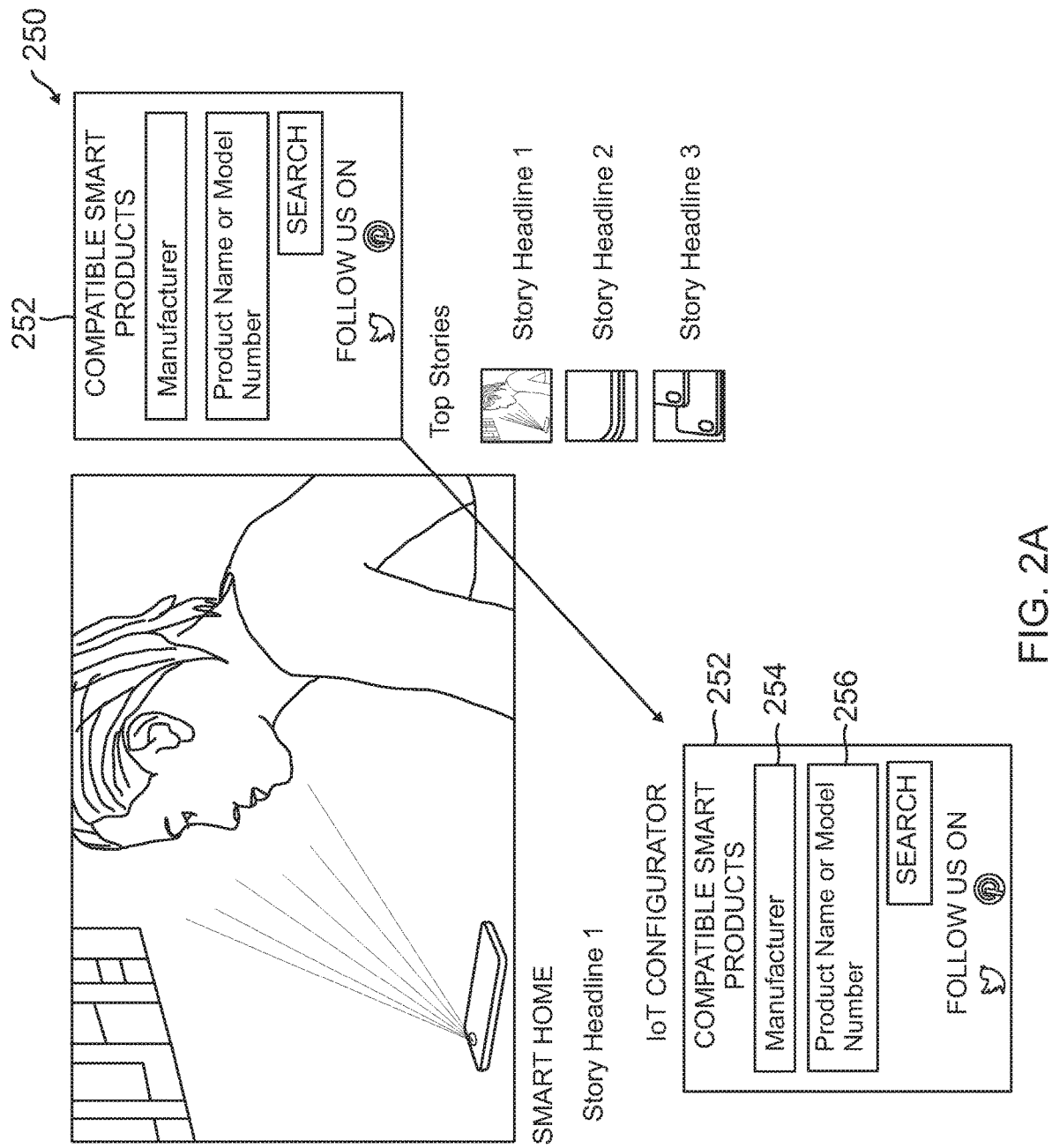
FIG. 2A is a block diagram of an example embodiment of a web page of the IoT Configurator that includes a search function.
Figure 2B:
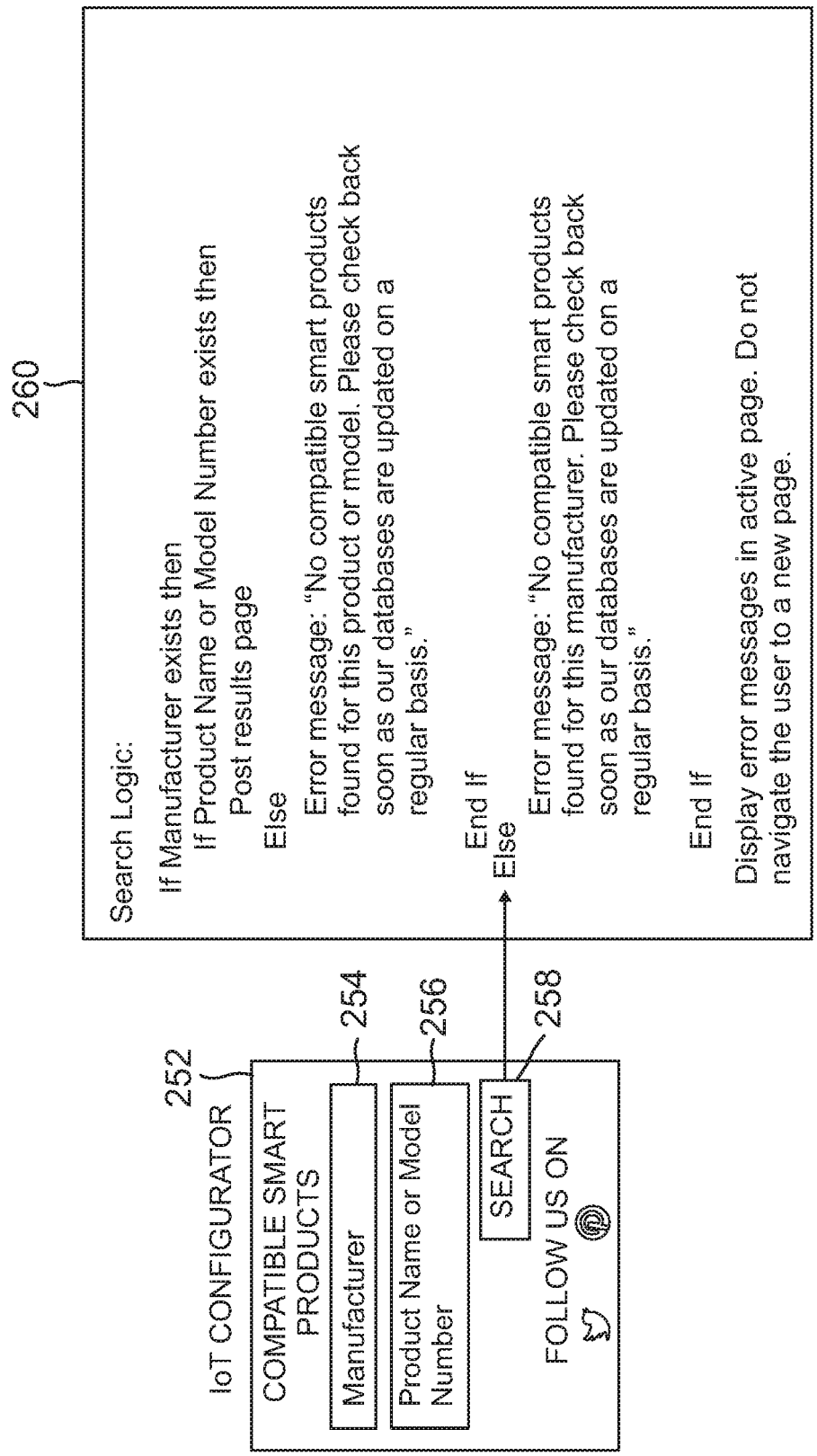
FIG. 2B is a block diagram of an example embodiment of the search function of FIG. 2A.
Figure 2C:
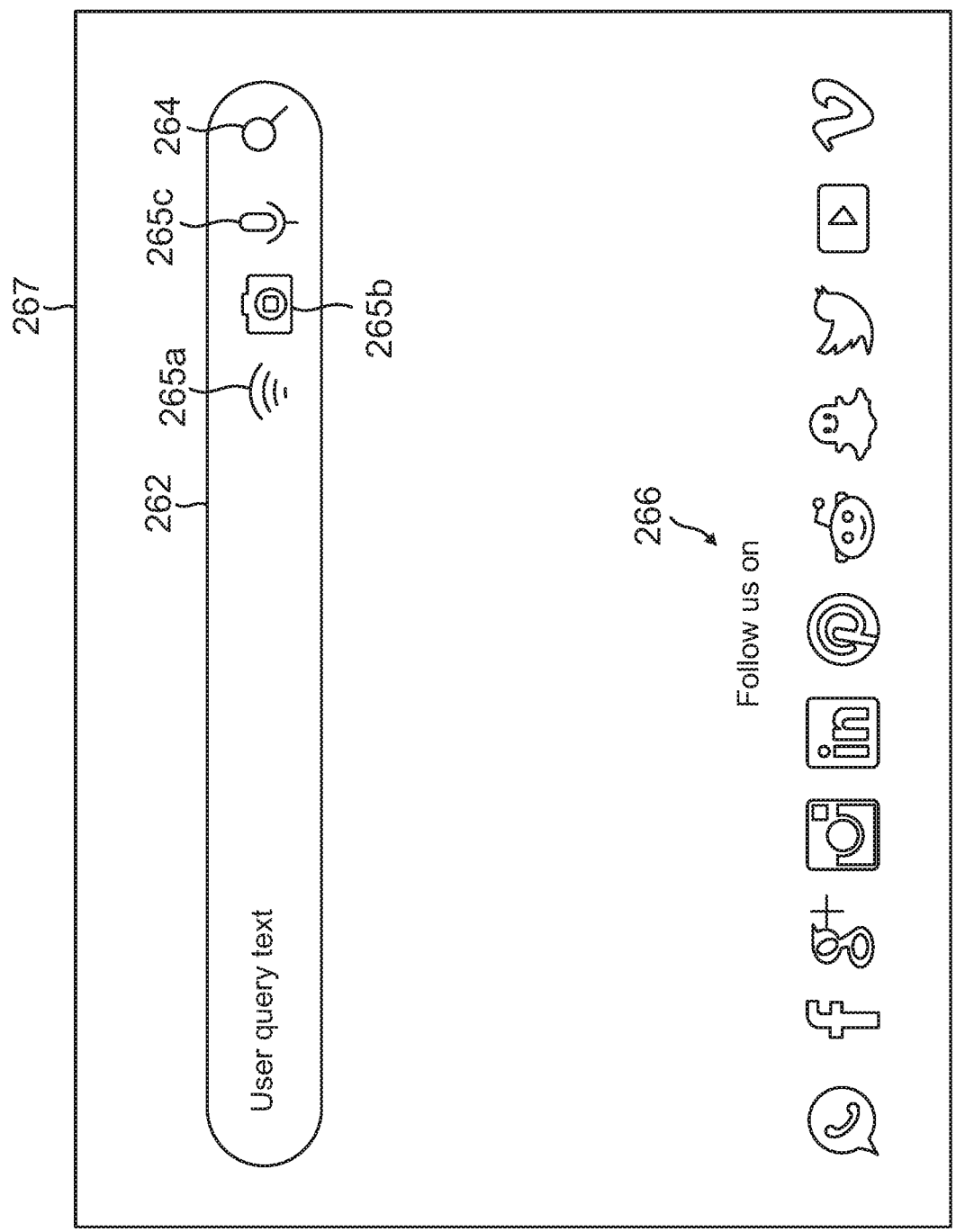
FIG. 2C is a block diagram of an example embodiment of a search function.

According to an example embodiment, a search function of the IoT Configurator may be available on all pages of the IoT Configurator as a sidebar, as disclosed below with regard to FIG. 2A and FIG. 3A. The search function may enable input of a user query that includes an image, text, speech, link, or a combination thereof. FIGS. 2A and 2B, disclosed below, disclose an example embodiment that employs text as a search criterion. FIG. 2C, disclosed further below, discloses an example embodiment that may employ image, text, speech, link, or a combination thereof, as the search criterion.

FIG. 2A is a block diagram of an example embodiment of a web page 250 with a search function 252 of the IoT Configurator 102 of FIG. 1, disclosed above. According to the example embodiment, the search function 252 is available as a sidebar of the web page 250. The search function 252 includes a first combobox 254 that allows a user to input text or choose from a list of manufacturers dynamically generated based on matching what the user is typing in real-time. Such matching may include determining that the input text is included within a search field. Such input text may include one or more operators, such as an OR, AND, or NOT operator, or any other suitable operator(s), wildcard character(s), such as an asterisk (*) character, or any other suitable character for controlling a search, or a combination thereof. The list of manufacturers may be pulled from the at least one IoT database 108, disclosed above with regard to FIG. 1.

The search function 252 further includes a second combobox that allows a user to input text or choose from a list of product names or model numbers based on the manufacturer selected based on the first combobox 254. According to an example embodiment, the product name or model list may be dynamically generated to match what the user is typing in real-time. The list of product names and model numbers may be pulled from the at least one IoT database 108.

FIG. 2B is a block diagram of an example embodiment of the search function 252 of FIG. 2A, disclosed above. The search function 252 includes a search control button 258 that may be initiated to cause the IoT Configurator 102 to employ the content of the first combobox 254 and the second combobox 256 as search criteria for searching the at least one IoT database 108. According to the example embodiment, search logic 260 may be employed by the IoT Configurator 102 to return an error message to the user in an event the IoT device identified by the first combobox 254 and the second combobox 256 does not exist in the at least one IoT database 108, or in an event the IoT device does exist in the at least one IoT database 108 but no compatible smart products are found. According to an example embodiment, the error message may be displayed in the active page rather than navigating the user to a new page in which the error message is displayed.

FIG. 2C is a block diagram of an example embodiment of a search function, that is, a singular search query entry box 262 for the user query. The singular search query entry point 262 may be employed instead of the search function 252 of FIGS. 2A and 2B, disclosed above, that include multiple boxes for entry of text. According to the example embodiment of FIG. 2C, the search may be activated by clicking on a magnifying glass icon 264 or by pressing the enter key (not shown) while the focus is in the singular search query entry box 262. The singular search query entry box 262 may be used by a user to enter text for the user query. The other icons represent additional ways to capture the user query. For example, the Wi-Fi icon 265a, camera icon 265b, and microphone icon 265c, may be employed to capture a link, image data (e.g., one or more static images or video), or speech data, respectively. Social media icons 266 may be presented, optionally, at the bottom of a search screen 267 that includes the singular search query entry box 262.

According to an example embodiment, results generated from searching the at least one IoT database 108 may be based on the search criteria entered by the user and may be displayed, dynamically, in a results web page, such as disclosed below with regard to FIG. 3A.

Figure 3A:
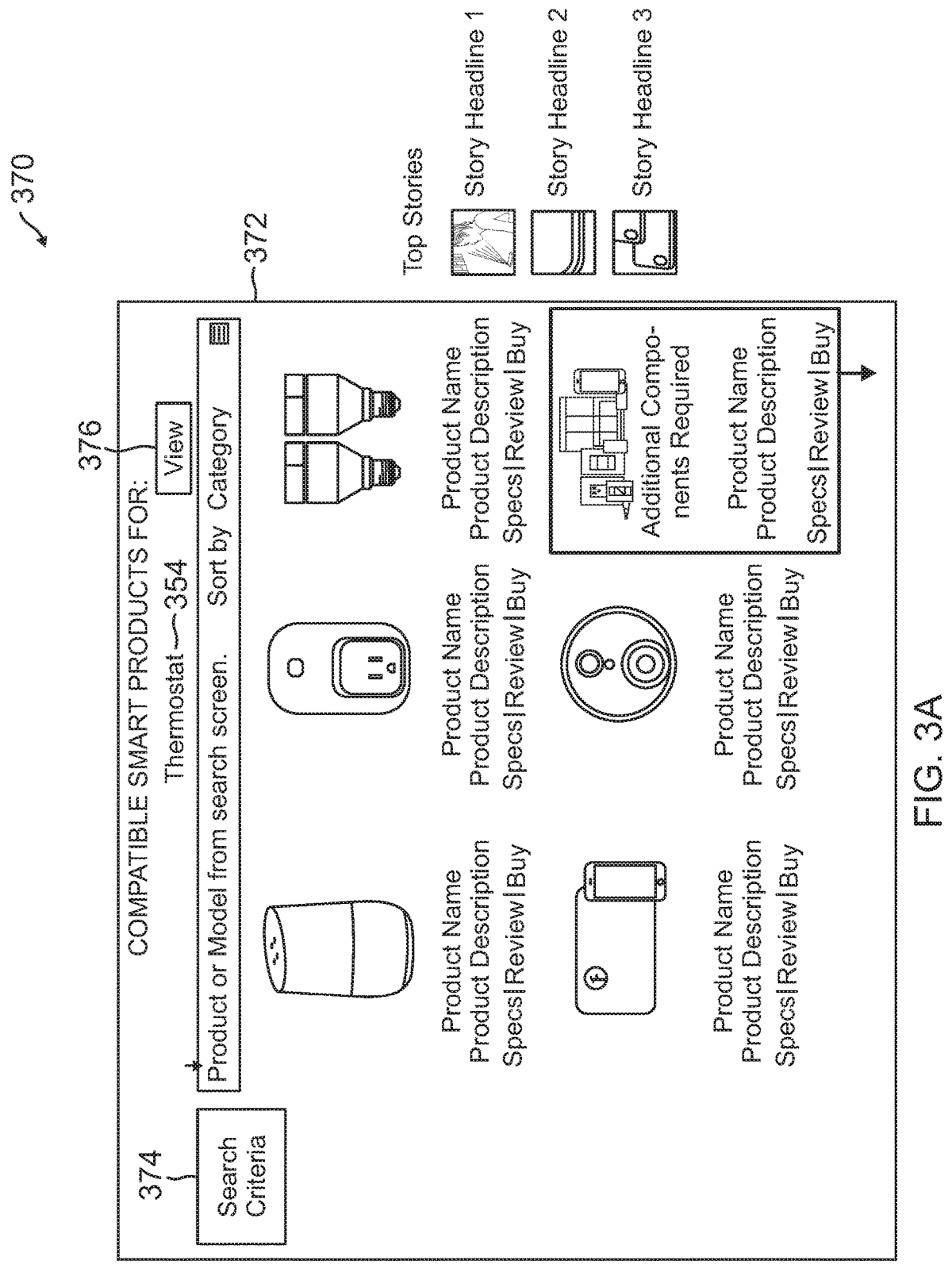

FIG. 3A is a block diagram of an example embodiment of a results web page 370 of the IoT Configurator 102 of FIG. 1, disclosed above. The results web page 370 includes a results screen 372. In an event the search logic 260 of FIG. 2B, disclosed above, determines that the IoT device identified by the first combobox 254 and the second combobox 256 does exist in the at least one IoT database 108, and compatible products are found based on the search, the IoT Configurator 102 may be configured to navigate the user to the results web page 370. Alternatively, the IoT Configurator 102 may be configured to navigate the user to the results web page 370 based on a successful search that is a function of search criteria entered via the search query entry box 262 of FIG. 2C, disclosed above. The results web page 370 may identify the given one or more connected products specified by the search function 252 of FIGS. 2A and 2B, or the search query entry box 262 of FIG. 2C, disclosed above. In the example embodiment of FIG. 3A, the given one or more connected products is a thermostat; however, the given one or more connected products may include any suitable IoT product(s). The results web page 370, that is, the response 118 provided to the user, may further identify IoT products found to be compatible with the thermostat 354 based on the search of the at least one IoT database 108.

The results web page 370 further displays images of corresponding compatible products, as well as names and descriptions of such compatible products. In addition, the results web page 370 may provide links to the appropriate specifications, reviews, and an affiliate link for purchase, in an event such links are found to exist in the at least one IoT database 108. Further, if a product is compatible but additional components are needed to enable the given one or more connected products to work with the compatible product(s) then a link(s) to such additional components may also be displayed within the results web page 370.

The results screen 372 may include a view button 376. The view button 376 may enable a user to change the view from Tile/Card (represented) to list, detail, or any other suitable view. The results screen 372 may further include a search criteria component 374 that would enable the user to initiate a new query. The search criteria component 374 may be any suitable component that enables the user to enter at least one search criterion, such as the singular search query entry box 262 of FIG. 2C, disclosed above, that may capture the at least one search criterion via a link, text, image data, speech data, etc.

Figure 3B:
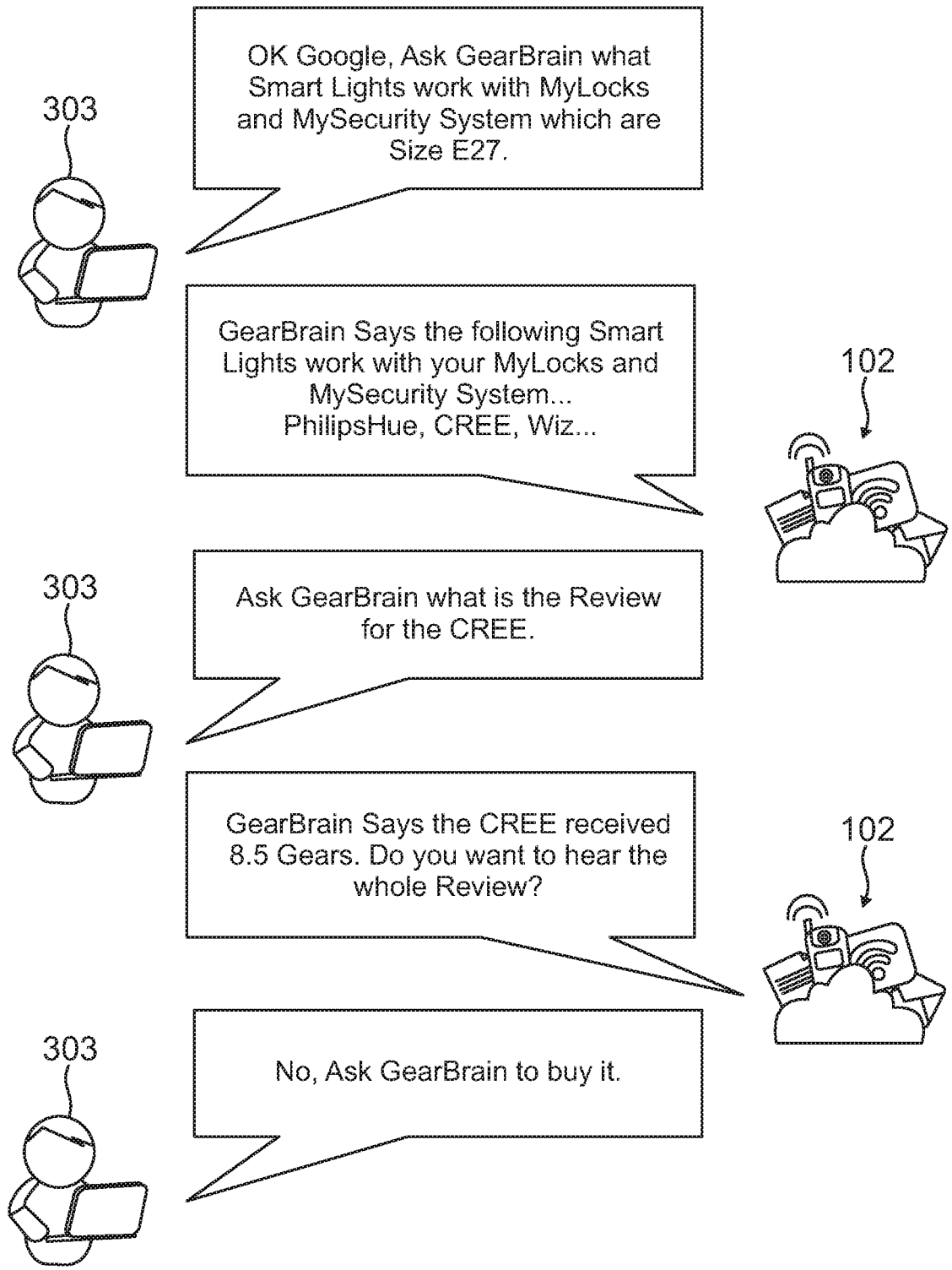
FIG. 3B is a block diagram of an example embodiment of a sequence of queries and responses between a user and the IoT Configurator of FIG. 1.

In the example embodiment of FIG. 3A, the IoT Configurator interface is shown in a Desktop view. It should be understood that a view of the IoT Configurator may be any suitable view, such as a whitelabel, kiosk, sales aid, or mobile view. According to an example embodiment, the IoT Configurator interface may be a voice interface. As such, there would be no visible interface and the response data may instead be spoken in pattern, such as disclosed below with regard to FIGS. 3B and 3C.

FIG. 3B is a block diagram of an example embodiment of a sequence of queries and responses between a user 303 and the IoT Configurator 102 (also referred to interchangeably herein as "GearBrain") of FIG. 1, disclosed above.

Figure 3C:
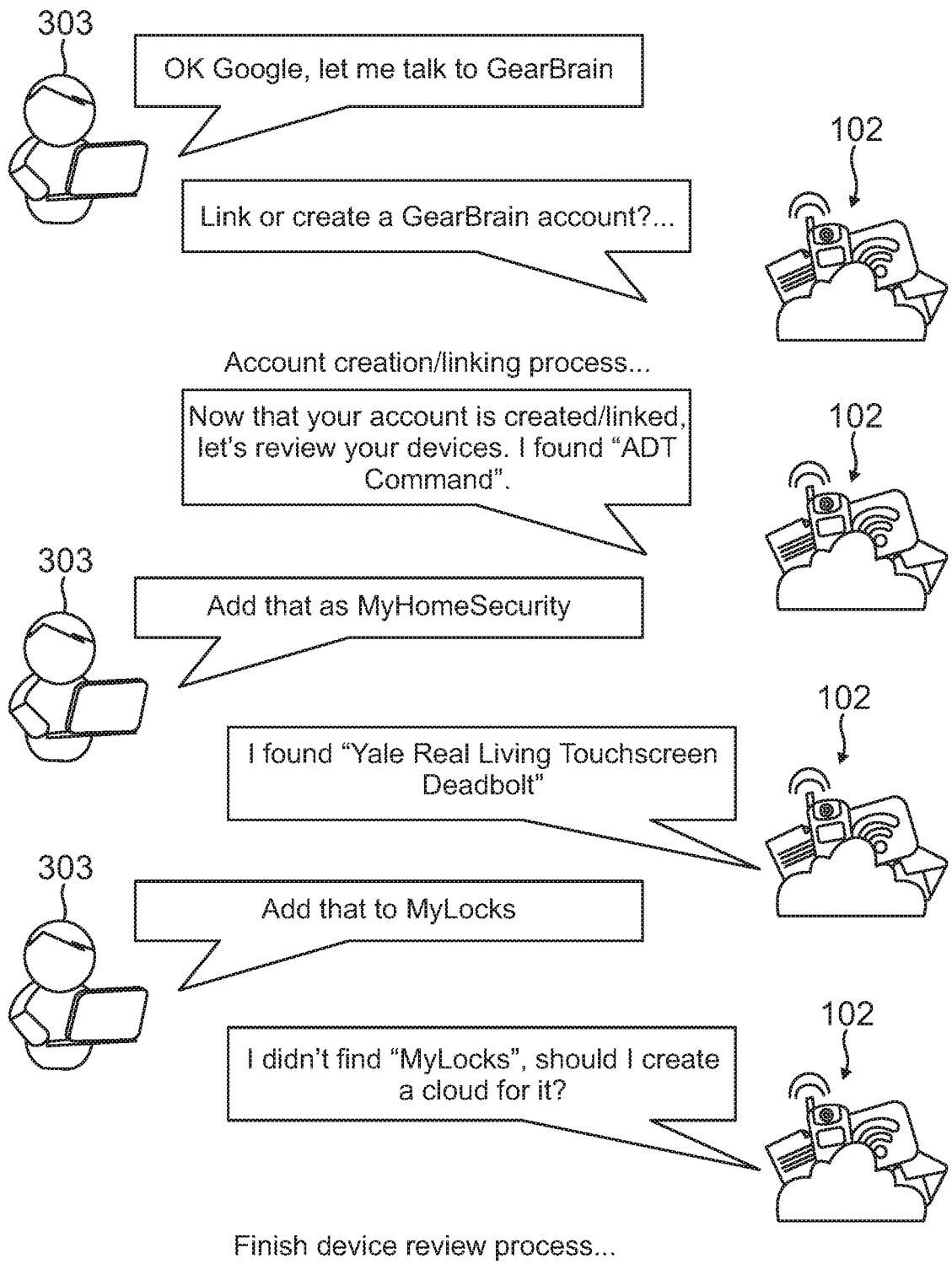
FIG. 3C is a block diagram of another example embodiment of a sequence of queries and responses between the user and the IoT Configurator.

FIG. 3C is a block diagram of another example embodiment of a sequence of queries and responses between the user 303 and the IoT Configurator 102 of FIG. 1, disclosed above.

Referring back to FIG. 1, according to an example embodiment, the IoT Configurator 102 may be developed using a HyperText Mark-up Language (HTML) and Python, or may be developed using any other suitable markup language and parser thereof, or any other software product(s) used for web or mobile application or web service development. The IoT Configurator 102 may be configured to support different mobile devices and browsers.

According to an example embodiment, the web or mobile application or web service(s) may include a plurality of screens. The plurality of screens may include but is not limited to a search screen, such as the IoT search function 252 of FIGS. 2A and 2B, or the search screen 267 of FIG. 2C, disclosed above, results screen, such as the results screen 372 disclosed above with regard to FIG. 3A, a data input screen (not shown), data modify screen (not shown), data delete screen (not shown), custom reporting query screen (not shown), and other screen(s) (not shown) as needed to deliver the service.

According to an example embodiment, such data input, modify, and delete screens of the IoT Configurator 102 may require user authentication implemented by a user authentication system. Tables of the IoT Configurator 102 may be accessible to such authenticated users for data maintenance through a web interface. Such tables may include but are not limited to the tables included in the attached Appendix.

According to an example embodiment, reporting screen(s) of the IoT Configurator 102 may not be accessed without user authentication. Users may be authenticated using any suitable user authentication system. The IoT Configurator 102 may include a reporting module (not shown) that may be configured to build custom reports through a direct query interface to all tables and/or views created for the IoT Configurator 102.

According to an example embodiment, the IoT Configurator 102 may employ the at least one IoT database 108 to house all IoT product identifiers and product related information. Some IoT Configurator data may pre-exist in a Content Management System (CMS), that may be any suitable CMS, and such content may be used to populate at least a portion of the stored IoT product information 106, such as a portion of the information of the tables of the attached Appendix. It should be understood that the stored IoT product information 106 is not limited to the information of the tables of the attached Appendix and may include any suitable product information.

According to an example embodiment, the at least one IoT database 108 may be a relational database management system (RDBMS), such as a MySQL database, object-oriented database management system (OODBMS), NoSQL database, or any other suitable database. The at least one IoT database 108 may be maintained and updated through a front-end web application and back-end data feeds. Such data feeds may be developed using Python, or any other suitable programming language, and may be completely automated. Such feeds may include multiple different feed types, such as manufacturer-driven feed type or a web-driven feed type. According to an example embodiment of a manufacturer-driven feed type, a manufacturer of an IoT product(s) may feed IoT product information directly to an administrator of the IoT Configurator 102 in a predetermined format for updating the at least one IoT database 108. Such data feeds may include the retailer driven IoT product information 132 from the retailer server 130, the manufacturer driven IoT product information 110 from the IoT vendor server 112, data from the client 142 sent via the API request 144, or a combination thereof.

According to an example embodiment of a web-driven feed type, a processor may be configured to scrape the web for IoT products. The processor may format data, collected via the scraping, according to a predetermined format. Such formatted data may be used to update (e.g., add, modify, delete) data of the at least one IoT database 108.

According to an example embodiment, different actions may be taken by the IoT Configurator 102 in response to processing a data feed, such as the manufacturer driven IoT product information 110, web scraped IoT product information 114, or retailer driven IoT product information 132. According to an example embodiment, the data feed may be dropped entirely or employed to update IoT product information of the at least one IoT database 108 by adding, modifying, or deleting data, or a combination thereof. The data feed may be evaluated and one or more items of the data feed may be flagged with a warning based on the evaluation. If one or more items of the data feed are flagged with a warning, the data feed may be dropped entirely. Alternatively, the data feed may be partially employed for items without warnings or fully employed, with the warnings ignored.

According to an example embodiment, technology, including artificial intelligence (AI), may be used to collect, from the web and other available sources, structured and unstructured data for updating (e.g., adding, modifying, deleting) product information of the at least one IoT database 108. Unstructured data files often include text and multimedia content. Examples include e-mail messages, word processing documents, videos, photos, audio files, presentations, webpages and many other kinds of business documents. Structured data refers to any data that resides in a fixed field within a record or file. This includes data contained in relational databases, Extensible Markup Language (XML), JavaScript Object Notation (JSON), and possibly spreadsheets.

According to an example embodiment, the technology may filter such data for accuracy. AI may be used to help consumers access the data in a variety of ways (e.g., voice, text, mobile application, desktop application, in-store kiosk, etc.) to "find" what they are looking for in a connected device or system.

Figure 4:
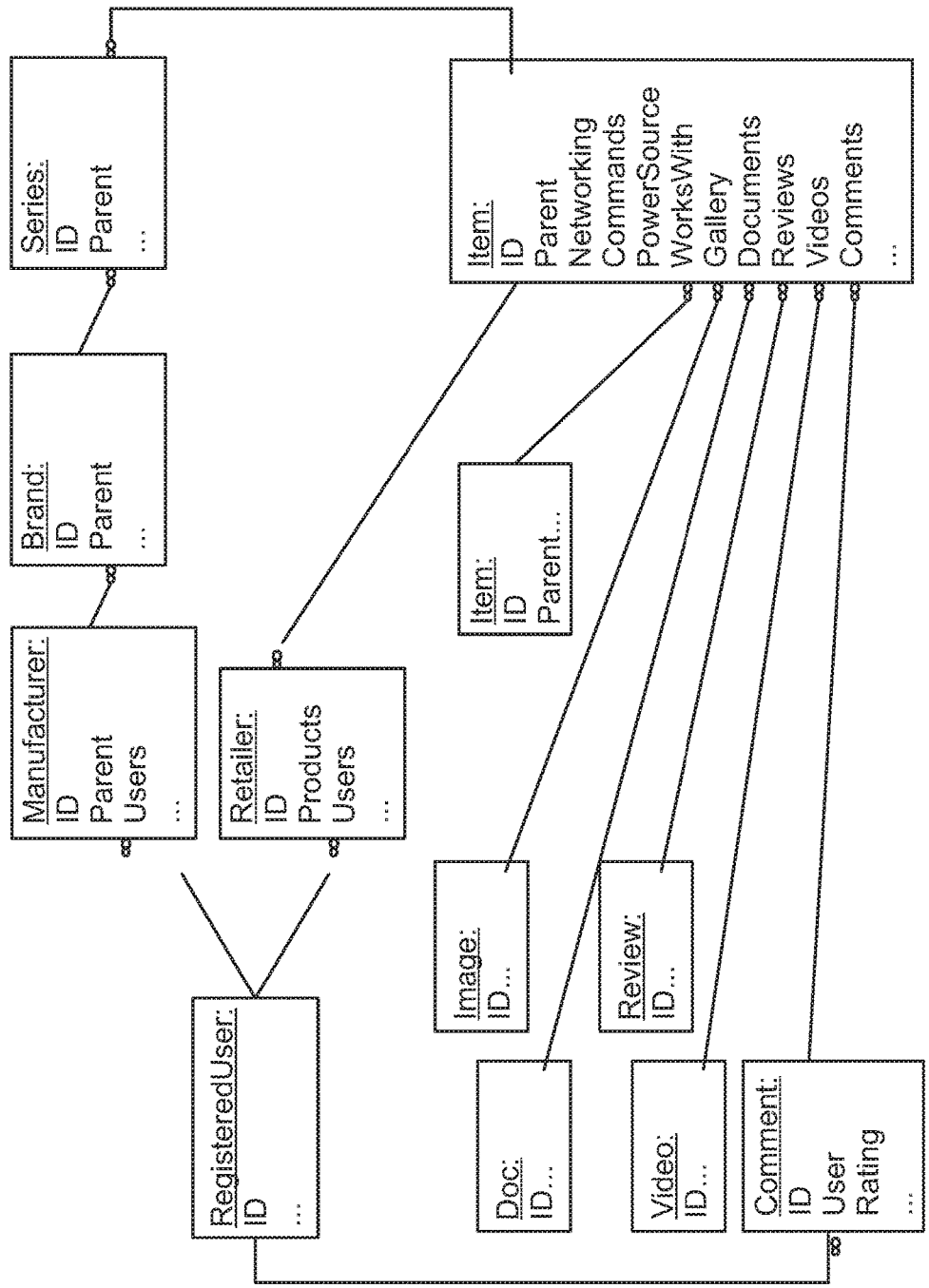
FIG. 4 is a block diagram of an example embodiment of a data model of the IoT Configurator of FIG. 1.

FIG. 4 is a block diagram of an example embodiment of a data model 400 of the IoT Configurator 102 of FIG. 1, disclosed above. The data model 400 includes a plurality of tables each with a unique identifier. It should be understood that the data model 400 is not limited to the plurality of tables shown or the information included therein. In the data model 400, the symbol "∞" indicates a one-to-many relationship and the identifier (ID) within each table is unique. The class model in the attached Appendix, in combination with the data model 400, provides an example embodiment of a framework of the IoT Configurator 102 of FIG. 1, disclosed above.

Figure 5:
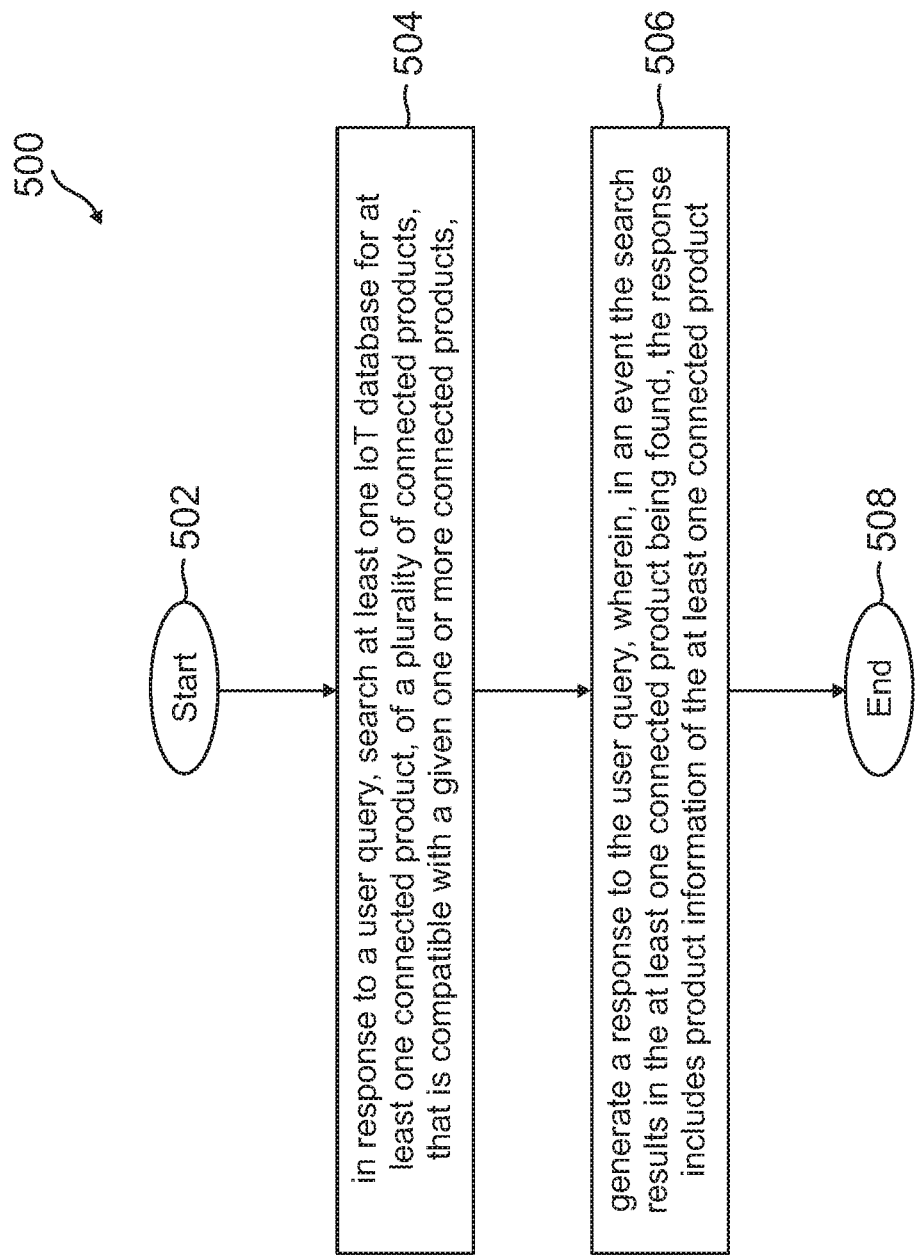
FIG. 5 is a flow diagram of an example embodiment of a computer-implemented method for the IoT Configurator of FIG. 1.

FIG. 5 is a flow diagram 500 of an example embodiment of a computer-implemented method for the IoT Configurator 102, disclosed above with regard to FIG. 1. The computer-implemented method begins (502) and, in response to a user query, searches at least one IoT database for at least one connected product, of a plurality of connected products, that is compatible with a given one or more connected products (504). The at least one IoT database may store product information associated with the plurality of connected products. The user query may represent product information associated with the given one or more connected products and may define at least one search criterion for the searching. The computer-implemented method generates a response to the user query, wherein, in an event the searching results in the at least one connected product being found, the response includes product information of the at least one connected product (506), and the computer-implemented method thereafter ends (508) in the example embodiment.

As disclosed above, the searching and generating may be implemented by a web application, mobile application, or one or more web services. The at least one search criterion may include any suitable information associated with the given one or more connected products. For example, the at least one search criterion may include but is not limited to a respective manufacturer name, product name, model number, series, brand, category, or universal product code (UPC), of the given one or more connected products, or combination thereof. The user query may include an image, text, speech, link, or a combination thereof. The response may include an image, video, text, speech, link, or a combination thereof.

The computer-implemented method may further comprise displaying a web-based user interface to enable a user to input text of at least a portion of text of the user query, such as disclosed above with regard to FIG. 2A. The computer-implemented method may further comprise matching the at least a portion of text to at least a portion of the product information stored in the at least one IoT database 108. The matching may be performed in real-time, concurrent with input of the at least a portion of text by the user, as disclosed above with regard to FIG. 2B.

The computer-implemented method may further comprise generating a list, dynamically, based on the matching; enabling the user to select an item from the list generated, such as disclosed above with regard to FIG. 2B. The computer-implemented method may further comprise employing the item selected as a search criterion of the at least one search criterion for the searching. The search criterion may include any suitable information associated with the given one or more connected products. For example, the at least one search criterion may include but is not limited to a respective manufacturer name, product name, model number, series, brand, category, or universal product code (UPC) of the given one or more connected products. In an event the searching fails to find (i) the given one or more connected products in the at least one IoT database 108 or (ii) any connected product, of the plurality of connected products of the at least one IoT database 108, that is compatible with the given one or more connected products, the response may include an error message, such as disclosed above with regard to FIG. 2B, or suggestion, the suggestion generated via artificial intelligence. The suggestion may present a recommendation for an alternate query to assist the user. As such, the IoT Configurator 102 may be configured to assist in refining the user query 116 via the response 118.

The matching/suggestion/recommendation may generated via artificial intelligence in communication with a machine learning network 105. In one example, the network is a decision network, such as a bayesian network.

The bayesian network may generate a model based on the collected data 106 from the IoT bot about the connected products, such as setup information, warranty information, capability or compatibility information, of an IoT device, or a combination thereof. The corpus of the connected product data may be used to generate a probabilistic directed acyclic graphical model that represents a set of variables and their conditional dependencies via a directed acyclic graph (DAG). The bayesian network may be used to assist in refining the user query 116 to process potential responses to the query by predicting the likelihood that any one of several possible responses are accurate. For example, the Bayesian network could represent the probabilistic relationships between connected products in the corpus. Given the user's query, the network 105 can be used to compute the probabilities of candidate connected products.

Efficient algorithms can perform inference and learning in Bayesian networks to process the user's query. For example, the bayesian network can model the query in directed acyclic graphs (DAGs) whose nodes represent variables in the connected product sense: they may be observable quantities, latent variables, unknown parameters or hypotheses. Edges represent conditional dependencies; nodes that are not connected (no path connects one node to another) represent variables that are conditionally independent of each other. Each node is associated with a probability function that takes, as input, a particular set of values for the node's parent variables, and gives (as output) the probability (or probability distribution, if applicable) of the variable represented by the node.

In this way, the IoT Configurator 102 can use the Bayesian network to implement a probabilistic graphical model which represents a set of variables and their conditional dependencies using graph models and proximity metrics of potential connected products.

In one embodiment, connected product clustering is to create groups of potential connected products that are intuitively close to each other because they are related to the same or to similar topics. To quantify the degree of connected product relatedness, proximity metrics may be defined to compare a multitude of connected product graphs. In this way, such metrics represent specificity of common concepts divided by overall specificity. If a connected product term appears less frequently in a reference corpus, the more specific the term may be considered. In other words, the inverse of a term's frequency may be used as a reliable measure of specificity, and an aggregate specificity of a number of different concepts may be computed by taking the sum of their specificities.

In another embodiment, a concept-set metric may be used to map each of the connected product graphs to a set of concepts and metaconcepts that it contains. The concepts are the concept traits of the graph nodes. Use of inverse frequency as a specificity metric generally provides a sufficient approximation to measure the specificity of a concept, i.e., its ability to characterize a specific topic. A variety of heuristics may be used to perform such a comparison between distributions, examples of which include vector-space sine.

Concept-set proximity generally yields results that are less precise than graph-intersection proximity because the former does not take into account the shape of the graphs. In one implementation, the first-level clustering may use concept-set proximity, while the second level may use graph proximity. Along these lines, graph intersection may be used to produce a graph to be used as a decision-tree pattern to generate the response to the user's query. In one embodiment, the response may be presented in a web page, such as the results screen 372 of the results web page 370 of FIG. 3A, disclosed above.

The computer-implemented method may further comprise enabling a user to input the user query via a first web page, such as disclosed above with regard to FIGS. 2A and 2B. In the event the searching results in the at least one connected product being found, generating the response may include navigating the user to a second web page, such as the results web page 370 of FIG. 3A, disclosed above. The second web page may display but is not limited to displaying product information of the at least one connected product identified as being compatible, product information of one or more products needed to enable interoperability between the given one or more connected products and the at least one connected product identified, or a combination thereof.

The response may include one or more links. The computer-implemented method may further comprise enabling the user to select the one or more links to purchase the at least one connected product identified as being compatible or to learn more about the at least one connected product identified.

The computer-implemented method may further comprise extracting data from at least one website and updating the at least one IoT database 108 based on the data extracted. The updating may include deleting data from the at least one IoT database 108, modifying data of the at least one IoT database 108, adding data to the at least one IoT database 108, or combination thereof. It should be understood that such extracting/updating are optional.

The computer-implemented method may further comprise receiving data from at least one data feed, such as the manufacturer driven IoT product information data feed 110 or the web scraped IoT product information data feed 114, disclosed above with regard to FIG. 1, and updating the at least one IoT database 108 based on the data received. The updating may include deleting data from the at least one IoT database 108, modifying data of the at least one IoT database 108, adding data to the at least one IoT database 108, or a combination thereof. It should be understood that such receiving/updating are optional.

The computer-implemented method may further comprise collecting structured data, unstructured data, or a combination thereof, via a network; filtering the structured data, unstructured data, or combination thereof, to produce filtered structured data; and storing the filtered structured data in the at least one IoT database. The structured data may reside in a fixed field within a record or file and the unstructured data may include text, multimedia content, or a combination thereof. The collecting may be based on artificial intelligence.

Referring back to FIG. 1, the IoT Configurator 102 may be a software tool that assists a user by identifying compatible IoT products for devices they already own or plan to buy in the near future. The user may employ the IoT Configurator 102 to assist with IoT product selection and configuration thereof, in order to successfully employ a given one or more connected products and at least one other connected product in a communications system, such as the communications system 600 disclosed below with regard to FIG. 6. It should be understood that the communications system 600 and plurality of connected IoT products included therein are for illustrative purpose only and that any suitable communications system and connected product may be employed.

Figure 6:
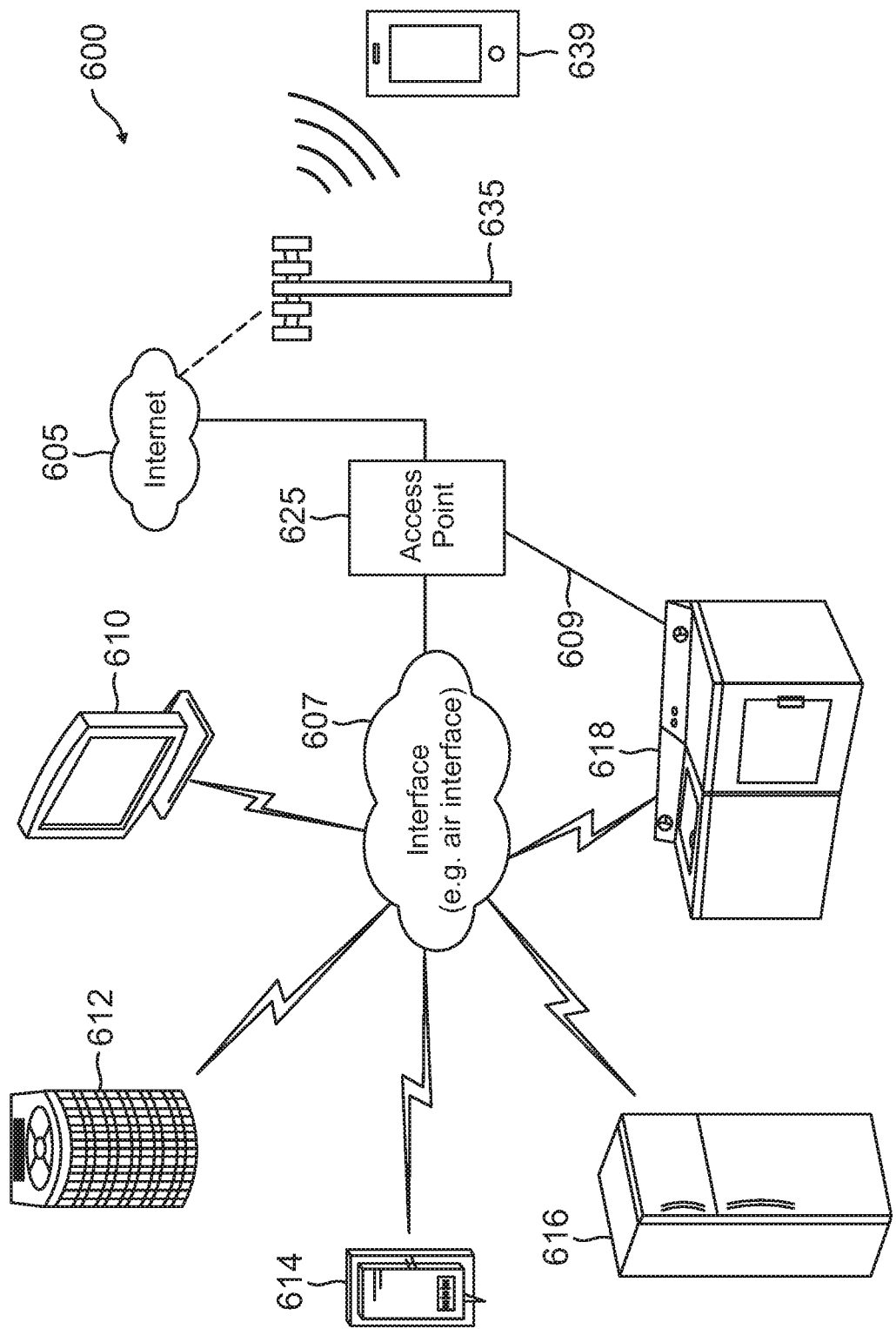
FIG. 6 is a block diagram of an example embodiment of a communications system that includes a plurality of IoT devices.

FIG. 6 is a block diagram of an example embodiment of a communications system 600 that includes a plurality of IoT devices. In the example embodiment, the communications system 600 is a wireless communications system that includes a plurality of IoT devices, such as a television 610, an outdoor air conditioning unit 612, a thermostat 614, a refrigerator 616, and a washer and dryer 618. The plurality of IoT devices are configured to communicate with an access network (e.g., an access point 625) over a physical communications interface or layer, shown in FIG. 6 as air interface 607 and a direct wired connection 609. The air interface 607 can comply with a wireless Internet protocol (IP), such as IEEE 802.11. Although FIG. 6 illustrates the IoT devices communicating over the air interface 607 and the IoT device 618 communicating over the direct wired connection 609, each IoT device may communicate over a wired or wireless connection, or both.

The communications system 600 includes the Internet 605 that may include a number of routing agents and processing agents (not shown in FIG. 6 for the sake of convenience). The Internet 605 is a global system of interconnected computers and computer networks that uses a standard Internet protocol suite (e.g., the Transmission Control Protocol (TCP) and IP) to communicate among disparate devices/networks. TCP/IP provides end-to-end connectivity specifying how data should be formatted, addressed, transmitted, routed and received at the destination. The communications system 600 further includes a cellular tower 635 coupled to the Internet 605 that enables a smartphone 639 and other cellular IoT devices (not shown) to communicate with the other IoT devices in the communications system 600, such as the television 610, etc.

It should be understood that the communications system 600 is for illustrative purpose and that embodiments disclosed herein are not limited to the IoT devices of the communications system 600 and that IoT devices disclosed herein may communicate via any suitable communications system.

Referring back to FIG. 1, the IoT Configurator 102 may be employed by a user to determine configuration and compatibility of the IoT devices of FIG. 6. For example, the at least one IoT database 108 may include stored product information 106 that may include capabilities of one or more of the IoT devices of FIG. 6 and interoperability therebetween.

For example, the stored product information 106 may include a first IoT device capability of a first IoT device of the IoT devices of FIG. 6. The first IoT device capability may include a capability of communicating using "ZigBee" communication protocols. In addition, the stored product information 106 may include a second device capability for a second IoT device of the IoT devices of FIG. 6. The second IoT device capability may include a capability of communicating using "XMPP" and "Z-Wave" communication protocols. As such, the user may enter a user query for a given one or more connected products, such as the first IoT device, and a response returned by the IoT Configurator 102 may indicate that the first IoT device would be compatible with the second IoT device if a physical hub supporting both ZigBee and Z-wave are employed or other translator appliance.

According to another example embodiment, an apparatus may be configured to implement the IoT configurator 102. The apparatus may comprise a user interface, processor, and memory, such as the I/O interface 864, memory 868, and CPU 860 of FIG. 8, disclosed further below. The memory may be coupled to the processor and may have stored thereon a sequence of instructions which, when loaded and executed by the processor, causes the processor to search the at least one IoT database 108 of FIG. 1, disclosed above, in response to the user query 116 received via the user interface, to identify at least one connected product, of a plurality of connected products, as being compatible with a given one or more connected products. The at least one IoT database 108 may store product information associated with the plurality of connected products, as disclosed above. The user query 116 may represent product information associated with the given one or more connected products and may define at least one search criterion for the searching. The sequence of instructions, such as the instructions 870 of FIG. 8, disclosed further below, may cause the processor to generate a response 118 to the user query 116, the response 118 displayed to a user via the user interface. In an event the at least one connected product is identified as being compatible, the response 118 may include product information of the at least one connected product identified.

According to another example embodiment, a computer-implemented method may enable the IoT Configurator 102 to be operated as a question and answering system, such as disclosed below with regard to FIG. 7.

Figure 7:
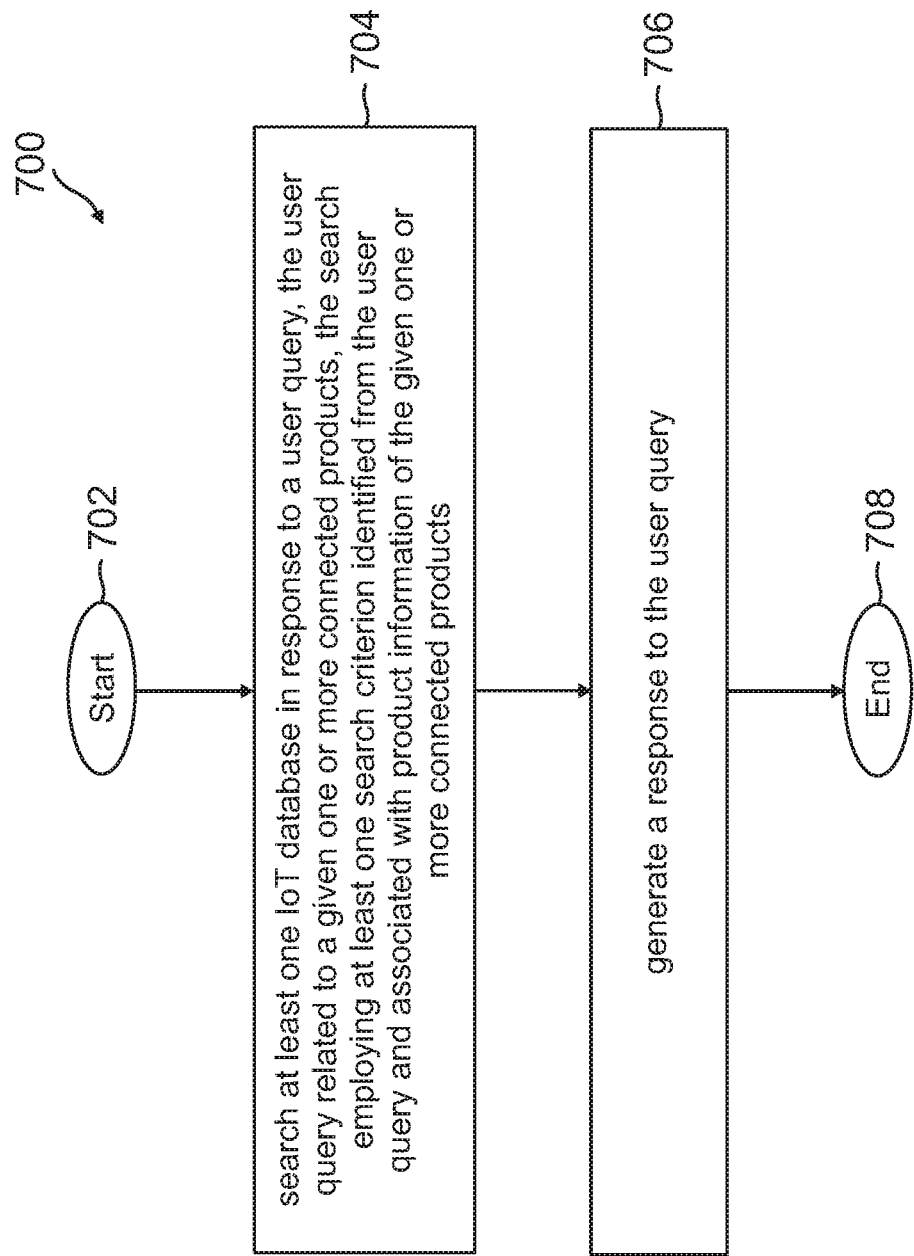
FIG. 7 is a flow diagram of an example embodiment of a computer-implemented method for operating an IoT configurator question and answering system.

FIG. 7 is a flow diagram 700 of an example embodiment of a computer-implemented method for operating an IoT configurator question and answering system. The method begins (702) and searches an IoT database in response to a user query (704). The user query may be related to a given one or more connected products. The searching may employ at least one search criterion identified from the user query and associated with product information of the given one or more connected products. The at least one IoT database may store product information corresponding to a plurality of connected products. The computer-implemented method generates a response to the user query (706) and the method thereafter ends (708) in the example embodiment. The response may be based on at least a portion of the product information corresponding to the plurality of connected products. The at least a portion may be retrieved via the at least one search criterion.

The user query may include an image, text, speech, link, or a combination thereof. The response may include an image, video, text, speech, link, or a combination thereof. The response may include compatibility or connectivity information related to interoperability between the given one or more connected products and one or more of the plurality of connected products. The response may include configuration, warranty, or other information associated with the given one or more connected products. The response may include a proposed configuration solution to an interoperability problem associated with the given one or more connected products and at least one other connected product. The interoperability problem may be identified in the user query. The computer-implemented method may further comprise employing artificial intelligence to determine the response.

The user query may include an image. The searching may include employing an image recognition method to process the image and identify the at least one search criterion for the searching. The user query may include speech. The searching may include employing a voice recognition method to process the speech and identify the at least one search criterion for the searching.

The IoT configurator can be used to eliminate a null result in response to the user query. In many cases, traditional search engines return results based on finding an exact word match with one or more of the entered terms. In such cases, search technologies often return a 'no results found' message. Example embodiments of the IoT configurator can find relations between words, images, and other data input into the query that are not based on exact, syntactic match. In this way, the present system can eliminate the 'no results' message and provide relevant suggestions in the list for comparison.

Figure 8:
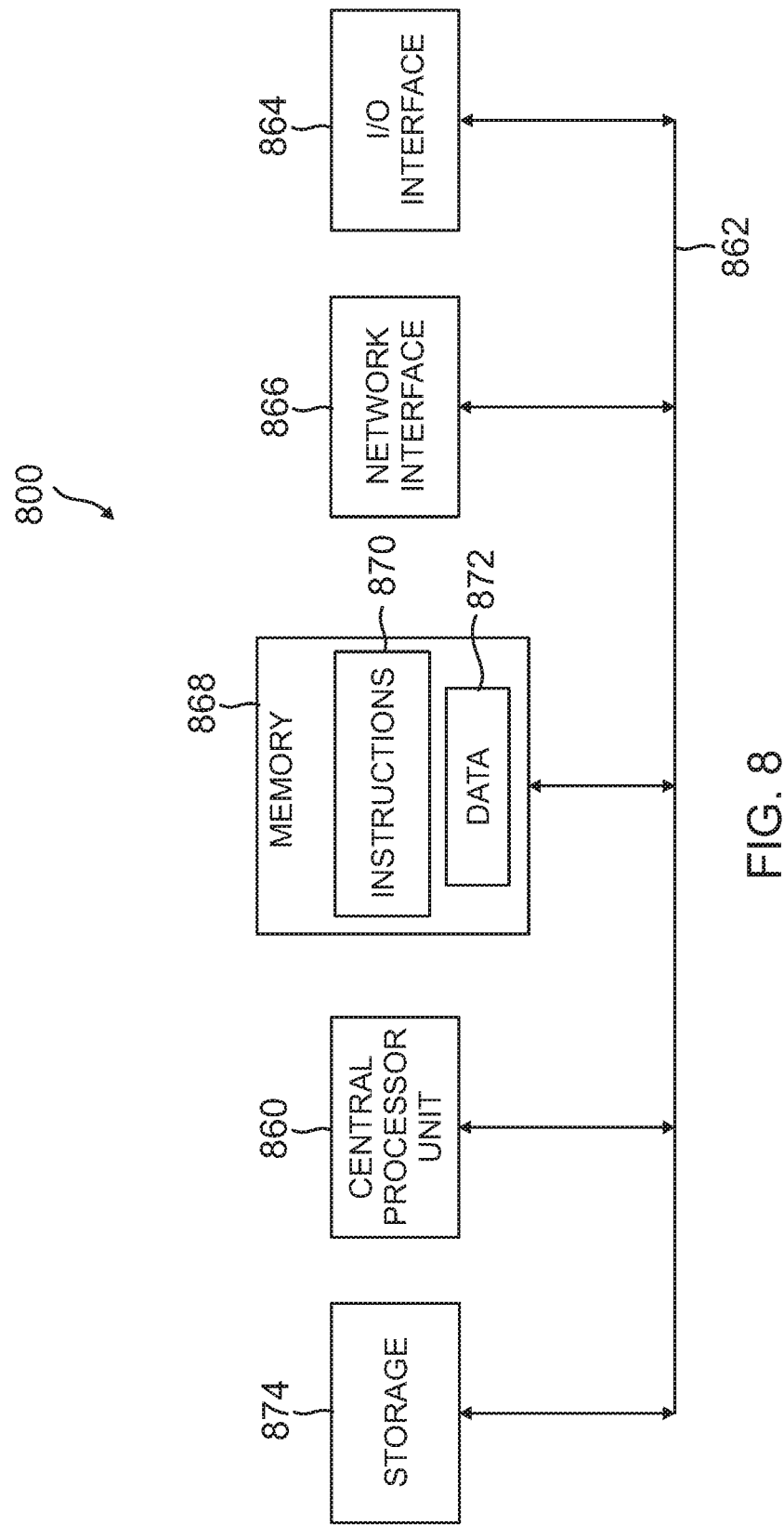
FIG. 8 is a block diagram of an example internal structure of a computer in which various embodiments of the present disclosure may be implemented.

FIG. 8 is a block diagram of an example of the internal structure of a computer 800 in which various embodiments of the present disclosure may be implemented. The computer 800 contains a system bus 862, where a bus is a set of hardware lines used for data transfer among the components of a computer or processing system. The system bus 862 is essentially a shared conduit that connects different elements of a computer system (e.g., processor, disk storage, memory, input/output ports, network ports, etc.) that enables the transfer of information between the elements. Coupled to the system bus 862 is an I/O device interface 864 that may include one or more interfaces for connecting various input and output devices (not such), such as but not limited to a keyboard, mouse, display, printer, speaker, microphone, camera, etc.) to the computer 800. A network interface 866 allows the computer 800 to connect to various other devices attached to a network. Memory 868 provides volatile storage for computer software instructions 870 and data 872 that may be used to implement embodiments of the present disclosure. Disk storage 874 provides non-volatile storage for computer software instructions 870 and data 872 that may be used to implement embodiments of the present disclosure. A central processor unit 860 is also coupled to the system bus 862 and provides for the execution of computer instructions. The system bus 862 is further coupled to power (not shown), display (not shown), keyboard (not shown), mouse (not shown), speakers (not shown), microphone (not shown), and camera (not shown).

Further example embodiments disclosed herein may be configured using a computer program product; for example, controls may be programmed in software for implementing example embodiments. Further example embodiments may include a non-transitory computer-readable medium containing instructions that may be executed by a processor, and, when loaded and executed, cause the processor to complete methods described herein. It should be understood that elements of the block and flow diagrams may be implemented in software or hardware, such as via one or more arrangements of circuitry of FIG. 8, disclosed above, or equivalents thereof, firmware, a combination thereof, or other similar implementation determined in the future. In addition, the elements of the block and flow diagrams described herein may be combined or divided in any manner in software, hardware, or firmware. If implemented in software, the software may be written in any language that can support the example embodiments disclosed herein. The software may be stored in any form of computer readable medium, such as random-access memory (RAM), read only memory (ROM), compact disk read-only memory (CD-ROM), and so forth. In operation, a general purpose or application-specific processor or processing core loads and executes software in a manner well understood in the art. It should be understood further that the block and flow diagrams may include more or fewer elements, be arranged or oriented differently, or be represented differently. It should be understood that implementation may dictate the block, flow, and/or network diagrams and the number of block and flow diagrams illustrating the execution of embodiments disclosed herein. Further, example embodiments and elements thereof may be combined in a manner not explicitly disclosed herein.

While example embodiments have been particularly shown and described, it will be understood by those skilled in the art that various changes in form and details may be made therein without departing from the scope of the embodiments encompassed by the appended claims.

What is claimed is:

1. A computer-implemented method for an Internet of Things (IoT) configurator, the computer-implemented method comprising:

implementing an IoT configurator interface to enable a user to input a user query;

in response to the user query received at the IoT configurator interface, searching at least one IoT database for at least one connected product, of a plurality of connected products, that is compatible with a given one or more connected products, where the at least one IoT database storing product information associated with the plurality of connected products and associated interoperability score for each of the respective connected products, the user query representing product information associated with the given one or more connected products and defining at least one search criterion for the searching;

using a scoring engine to determine the respective interoperability score for each of the connected products;

generating a response to the user query based on the interoperability score for the one or more connected products, wherein, in an event the searching results in the at least one connected product being found, the response includes product information of the at least one connected product;

receiving data from at least one data feed;

updating the at least one IoT database based on the data received, the updating including deleting data from the at least one IoT database, modifying data of the at least one IoT database, adding data to the at least one IoT database, or combination thereof;

using machine learning, collecting structured data, unstructured data, or a combination thereof, via network;

filtering the structured data, unstructured data, or combination thereof, to produce filtered structured data; and storing the filtered structured data in the at least one IoT database by determining interoperability factors for each the connected products of the structured data.

2. The computer-implemented method of claim 1, wherein the searching and generating are implemented by a web application, mobile application, or one or more web services; and wherein the at least one search criterion includes a respective manufacturer name, product name, model number, series, brand, category, or universal product code (UPC) of the given one or more connected products, or combination thereof.

3. The computer-implemented method of claim 1, wherein the user query received at the IoT configurator interface includes an image, text, speech, link, or a combination thereof;

the IoT configurator displaying a web-based user interface to enable a user to input an image, video, text, speech, link, or a combination thereof of the user query;

the user query is processed by IoT configurator; and the response to the user query processed by the IoT configurator includes an image, video, text, speech, link, or a combination thereof.

4. The computer-implemented method of claim 3, further including the IoT configurator matching the at least a portion of text to at least a portion of the product information stored in the at least one IoT database, such that the matching is performed in real-time, concurrent with input of the at least a portion of text by the user; and wherein the at least one IoT database is a relational database management system (RDBMS), object-oriented database management system (OODBMS), or NoSQL database.

5. The computer-implemented method of claim 4, further comprising the IoT configurator:

extracting interoperability data from at least one website; and updating the at least one IoT database based on the data extracted, the updating including deleting data from the at least one IoT database, modifying data of the at least one IoT database, adding data to the at least one IoT database, or combination thereof;

generating a list, dynamically, based on the matching and interoperability score from the scoring engine;

enabling the user to select an item from the list generated; and employing the item selected as a search criterion of the at least one search criterion for the searching.

6. The computer-implemented method of claim 5, wherein the IoT configurator matching computationally implements connected product clustering to determine the respective interoperability score including:

producing a plurality of connected product graphs based on linguistic analysis of a corpus of potential connected products, the linguistic analysis being performed by a connected products linguistic analysis module;

clustering the plurality of connected product graphs into a plurality of connected product clusters through use of one or more proximity metrics, such that each connected product cluster corresponds to a potential connected product that pertains to the same or similar topics; and processing the connected product clusters to prioritize topics handled by the IoT configurator accessible on at least one computing device to dynamically generate a list of matches.

7. The computer-implemented method of claim 6, wherein the IoT configurator matching computationally implements connected product clustering improves the quality of the IoT configurator matching and interoperability scoring by using machine learning to focus on high-impact topics first, by offering the possibility of using analytics results viewed per topic, and by identifying a topic in cases where the IoT configurator cannot determine a specific intent for a user input.

8. The computer-implemented method of claim 5, wherein the search criterion is a respective manufacturer name, product name, model number, series, brand, category, universal product code (UPC), or interoperability factors of the given one or more connected products; and the given one or more connected products include at least one IoT device, system of IoT devices, at least one service, at least one application, at least one command, or a combination thereof.

9. The computer-implemented method of claim 5, wherein the connected products clustering is performed through the use of the one or more proximity metrics that includes a concept-set proximity metric.

10. The computer-implemented method of claim 1, wherein, in an event the searching fails to find (i) the given one or more connected products in the at least one IoT database or (ii) any connected product, of the plurality of connected products of the at least one IoT database, that is compatible with the given one or more connected products, the response includes an error message or suggestion, the suggestion generated via artificial intelligence.

11. The computer-implemented method of claim 1, further comprising enabling a user to input the user query via a first web page and wherein, in the event the searching results in the at least one connected product being found, generating the response includes navigating the user to a second web page, the second web page displaying the product information of the at least one connected product, product information of one or more products needed to enable interoperability between the given one or more connected products and the at least one connected product, or a combination thereof.

12. The computer-implemented method of claim 1, wherein, in the event the searching results in the at least one connected product being found, the response includes one or more links and wherein the computer-implemented method further comprises enabling the user to select at least one link of the one or more links to purchase the at least one connected product or to learn more about the at least one connected product.

13. The computer-implemented method of claim 1 further includes using a scoring engine to determine an interoperability score for the connected products by:

defining a threshold value for each interoperability factor;

determining a degree to which each interoperability factor is present for each of the connected products;

for each of the interoperability factors, allotting a score for the respective interoperability factor of a subject connected product based on the degree to which a respective interoperability factor is present; and aggregating scores for each interoperability factor for each connected product to determine an interoperability score for that connected product.

14. The computer-implemented method of claim 13, wherein each connected product is associated with a respective vector representative of each of its interoperability factor scores and its interoperability score; and mapping vector space of interoperability scores for each of the connected products to facilitate the results presented in a list.

15. The computer-implemented method of claim 1, wherein the structured data resides in a fixed field within a record or file and wherein the unstructured data includes text, multimedia content, or a combination thereof.

16. The computer-implemented method of claim 1, wherein the response includes configuration, warranty, or other information associated with the given one or more connected products; and wherein the response includes a proposed configuration solution to an interoperability problem associated with the given one or more connected products and at least one other connected product, the interoperability problem identified in the user query.

17. The computer-implemented method of claim 1, wherein the user query includes an image and wherein the searching includes employing an image recognition method to process the image to identify the at least one search criterion for the searching; and wherein the user query includes speech and wherein the searching includes employing a voice recognition method to process the speech to identify the at least one search criterion for the searching.

18. An apparatus configured to implement an Internet of Things (IoT) configurator, the apparatus comprising:

a user interface; and a processor and memory, the memory coupled to the processor and having stored thereon a sequence of instructions which, when loaded and executed by the processor, causes the processor to:

implement an IoT configurator to enable a user to input a user query;

in response to a user query received via the user interface, the IoT configurator performing a search of at least one IoT database for at least one connected product and associated interoperability score for each of the respective connected products, of a plurality of connected products, that is compatible with a given one or more connected products, the at least one IoT database storing product information associated with the plurality of connected products, the user query representing product information associated with the given one or more connected products and defining at least one search criterion for the searching;

execute a scoring engine to compute the respective interoperability score for each of the connected products;

generate a response to the user query based on the respective interoperability score for each of the connected products, the response displayed to a user via the user interface, wherein, in an event the search finds the at least one connected product, the response includes product information of the at least one connected product;

receive data from at least one data feed;

update the at least one IoT database based on the data received, the updating including deleting data from the at least one IoT database, modifying data of the at least one IoT database, adding data to the at least one IoT database, or combination thereof;

using machine learning, collect structured data, unstructured data, or a combination thereof, via network;

filter the structured data, unstructured data, or combination thereof, to produce filtered structured data; and store the filtered structured data in the at least one IoT database by determining interoperability factors for each the connected products of the structured data.

19. The apparatus configured to implement an Internet of Things (IoT) configurator of claim 18, wherein the structured data resides in a fixed field within a record or file and wherein the unstructured data includes text, multimedia content, or a combination thereof.

20. A computer-implemented method for operating an Internet of Things (IoT) configurator question and answering system, the computer-implemented method comprising:

searching at least one IoT database in response to a user query, the user query related to a given one or more connected products and associated interoperability score for each of the respective connected products, the searching employing at least one search criterion identified from the user query and associated with product information of the given one or more connected products, the at least one IoT database storing product information corresponding to a plurality of connected products;

implementing a scoring engine to compute the respective interoperability score for each of the connected products;

generating a response to the user query based on the respective interoperability score for each of the connected products, the response based on at least a portion of the product information, including the respective interoperability score for each connected product, the at least a portion retrieved via the at least one search criterion;

using the scoring engine to determine an interoperability score for the connected products by:

defining a threshold value for each interoperability factor;

determining a degree to which each interoperability factor is present for each of the connected products;

for each of the interoperability factors, allotting a score for the respective interoperability factor of a subject connected product based on the degree to which a respective interoperability factor is present; and aggregating scores for each interoperability factor for each connected product to determine an interoperability score for that connected product;

wherein each connected product is associated with a respective vector representative of each of its interoperability factor scores and its interoperability score; and mapping vector space of interoperability scores for each of the connected products to facilitate the results presented in a list.

21. A computer-implemented method for an Internet of Things (IoT) configurator, the computer-implemented method comprising:

implementing an IoT configurator interface to enable a user to input a user query;

in response to the user query received at the IoT configurator interface, searching at least one IoT database for at least one connected product, of a plurality of connected products, that is compatible with a given one or more connected products, where the at least one IoT database storing product information associated with the plurality of connected products and associated interoperability score for each of the respective connected products, the user query representing product information associated with the given one or more connected products and defining at least one search criterion for the searching;

using a scoring engine to determine the respective interoperability score for each of the connected products;

generating a response to the user query based on the interoperability score for the one or more connected products, wherein, in an event the searching results in the at least one connected product being found, the response includes product information of the at least one connected product;

receiving data from at least one data feed;

updating the at least one IoT database based on the data received, the updating including deleting data from the at least one IoT database, modifying data of the at least one IoT database, adding data to the at least one IoT database, or combination thereof;

using machine learning, collecting structured data, unstructured data, or a combination thereof, via network;

filtering the structured data, unstructured data, or combination thereof, to produce filtered structured data; and storing the filtered structured data in the at least one IoT database by determining interoperability factors for each the connected products of the structured data;

matching the at least a portion of text from the user query to at least a portion of the product information stored in the at least one IoT database, such that the matching is performed in real-time, concurrent with input of the at least a portion of text by the user; and wherein the at least one IoT database is a relational database management system (RDBMS), object-oriented database management system (OODBMS), or NoSQL database;

extracting interoperability data from at least one website; and updating the at least one IoT database based on the data extracted, the updating including deleting data from the at least one IoT database, modifying data of the at least one IoT database, adding data to the at least one IoT database, or combination thereof;

generating a list, dynamically, based on the matching and interoperability score from the scoring engine;

enabling the user to select an item from the list generated; and employing the item selected as a search criterion of the at least one search criterion for the searching.

* * * * *